United States Patent
Crow et al.

(10) Patent No.: US 7,315,984 B2
(45) Date of Patent: Jan. 1, 2008

(54) USER INTERFACE FOR PRESENTING MEDIA INFORMATION

(75) Inventors: Daniel N. Crow, San Francisco, CA (US); Cary Dean, Sunnyvale, CA (US); Elizabeth Dykstra-Erickson, San Francisco, CA (US); J. Peter Hoddie, Mountain View, CA (US); Steven P. Jobs, Palo Alto, CA (US); Timothy E. Wasko, High River (CA)

(73) Assignee: Apple Inc., Cupertino, CA (US)

( * ) Notice: Subject to any disclaimer, the term of this patent is extended or adjusted under 35 U.S.C. 154(b) by 257 days.

(21) Appl. No.: 10/308,315

(22) Filed: Dec. 2, 2002

(65) Prior Publication Data

US 2003/0080991 A1   May 1, 2003

Related U.S. Application Data

(63) Continuation of application No. 09/293,507, filed on Apr. 15, 1999, now Pat. No. 6,538,665.

(51) Int. Cl.
  *G06F 3/00* (2006.01)
(52) U.S. Cl. .................... 715/716; 715/719; 715/769; 715/833; 715/974
(58) Field of Classification Search ............... 345/723, 345/764, 725, 726, 786, 973; 715/723, 764, 715/725, 726, 786, 973, 716, 719, 722, 727, 715/769, 833, 974
  See application file for complete search history.

(56) References Cited

U.S. PATENT DOCUMENTS 5,404,316 A  *  4/1995  Klingler et al. ............. 345/328
5,495,566 A  *  2/1996  Kwantinetz ................. 345/341
5,519,828 A  *  5/1996  Rayner ....................... 345/326

(Continued)

OTHER PUBLICATIONS

Quick Time Movie Player Ver. 2.1.2.59 (Screendumps, 1 page, 1996).*

(Continued)

*Primary Examiner*—Sy D. Luu
(74) *Attorney, Agent, or Firm*—Blakely, Sokoloff, Taylor & Zafman LLP

(57) ABSTRACT

A user interface and methods for using a user interface for controlling processing of time-based media files. In one exemplary method, a graphical representation of a time line for a time-based media is displayed along with a graphical representation of a current time along the graphical representation of the time line. A start graphical indicator and a stop graphical indicator is also displayed along the graphical representation of the time line. A portion of the time-based media may be selected for presentation by dragging or positioning at least one of the start graphical indicator and the stop graphical indicator along the graphical representation of the time line. In another aspect of the invention, an exemplary method allows for the adaptive control of a portion of the interface which indicates time relating to a time-based media. An input speed is determined where this input is to change the portion and the rate at which the change to this portion occurs is dependent upon the input speed. Other aspects of the present invention relating to the interface for controlling the processing of time-based media files are also described.

56 Claims, 25 Drawing Sheets

U.S. PATENT DOCUMENTS

| | | | |
|---|---|---|---|
| 5,611,060 A | | 3/1997 | Belfiore et al. |
| 5,664,128 A | | 9/1997 | Bauer |
| 5,682,326 A | * | 10/1997 | Klingler et al. ............. 345/328 |
| 5,726,687 A | | 3/1998 | Belfiore et al. |
| 5,732,184 A | * | 3/1998 | Chao et al. ................ 345/328 |
| 5,745,096 A | | 4/1998 | Ludolph et al. |
| 5,758,180 A | * | 5/1998 | Duffy et al. ................ 710/122 |
| 5,760,767 A | * | 6/1998 | Shore et al. ................ 345/328 |
| 5,874,958 A | | 2/1999 | Ludolph |
| 5,999,173 A | * | 12/1999 | Ubillos ....................... 345/328 |
| 6,026,389 A | * | 2/2000 | Nakajima et al. .............. 707/1 |
| 6,031,529 A | | 2/2000 | Migos |
| 6,061,062 A | * | 5/2000 | Venolia ...................... 345/856 |
| 6,072,503 A | * | 6/2000 | Tani et al. .................. 345/473 |
| 6,204,840 B1 | * | 3/2001 | Petelycky et al. ....... 707/500.1 |
| 6,332,147 B1 | * | 12/2001 | Moran et al. ............ 715/500.1 |
| 6,366,296 B1 | | 4/2002 | Boreczky et al. |
| 6,369,835 B1 | | 4/2002 | Lin |
| 6,834,371 B1 | * | 12/2004 | Jensen et al. ............ 715/500.1 |

OTHER PUBLICATIONS

On-Line Definition for "Playback" (American Heritage Dictionary of the English Language, 4th Edition, 2000, p. 1).*

Quick Time Movie Player Screendumps illustrating Current Time Indicator Dragging Operation (Ver. 2.1.2.59, 1996, p. 1).*

PCT International Search Report, mailed Jul. 11, 2000, PCT/US00/10441, 5 pages.

* cited by examiner

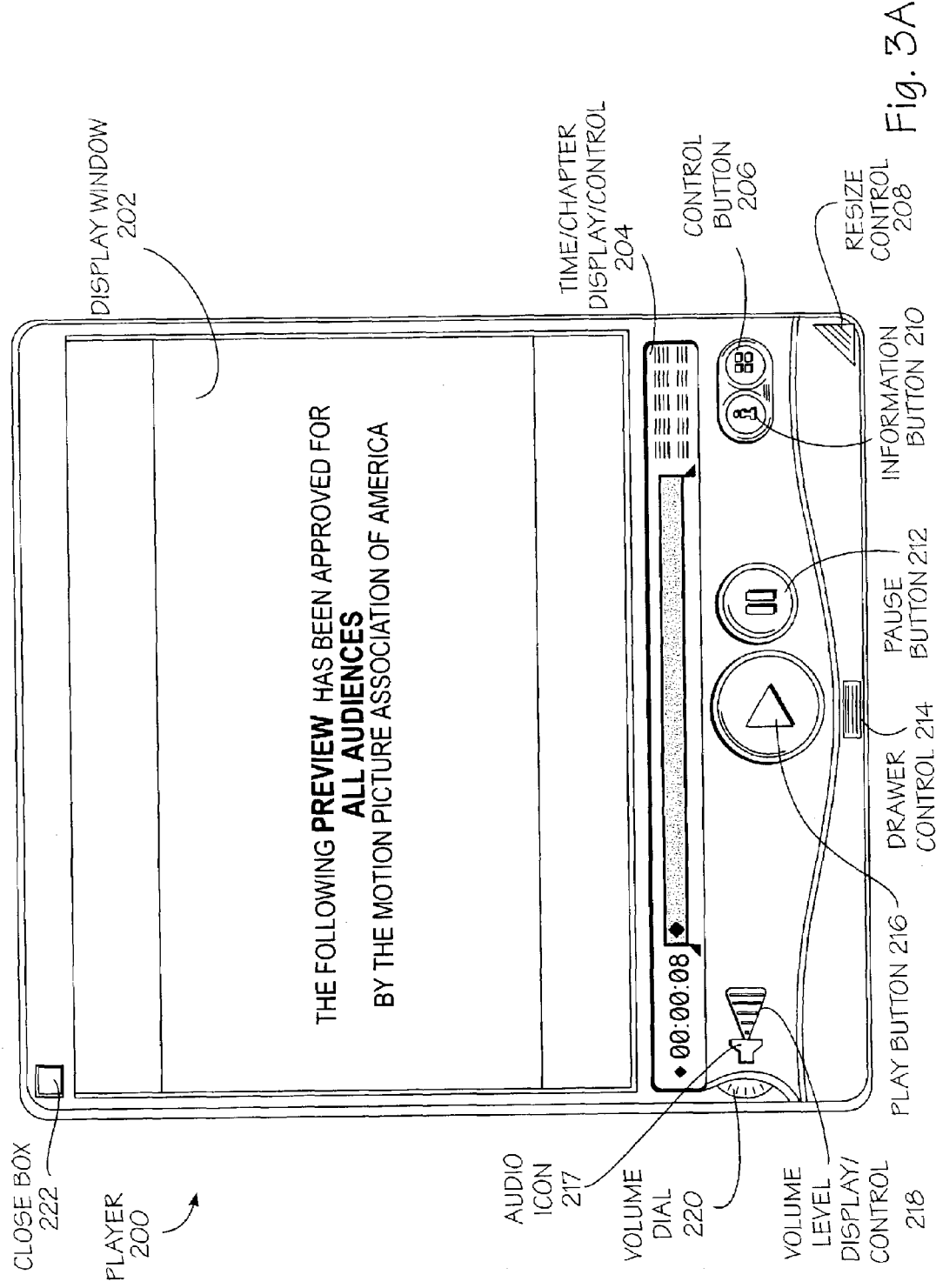

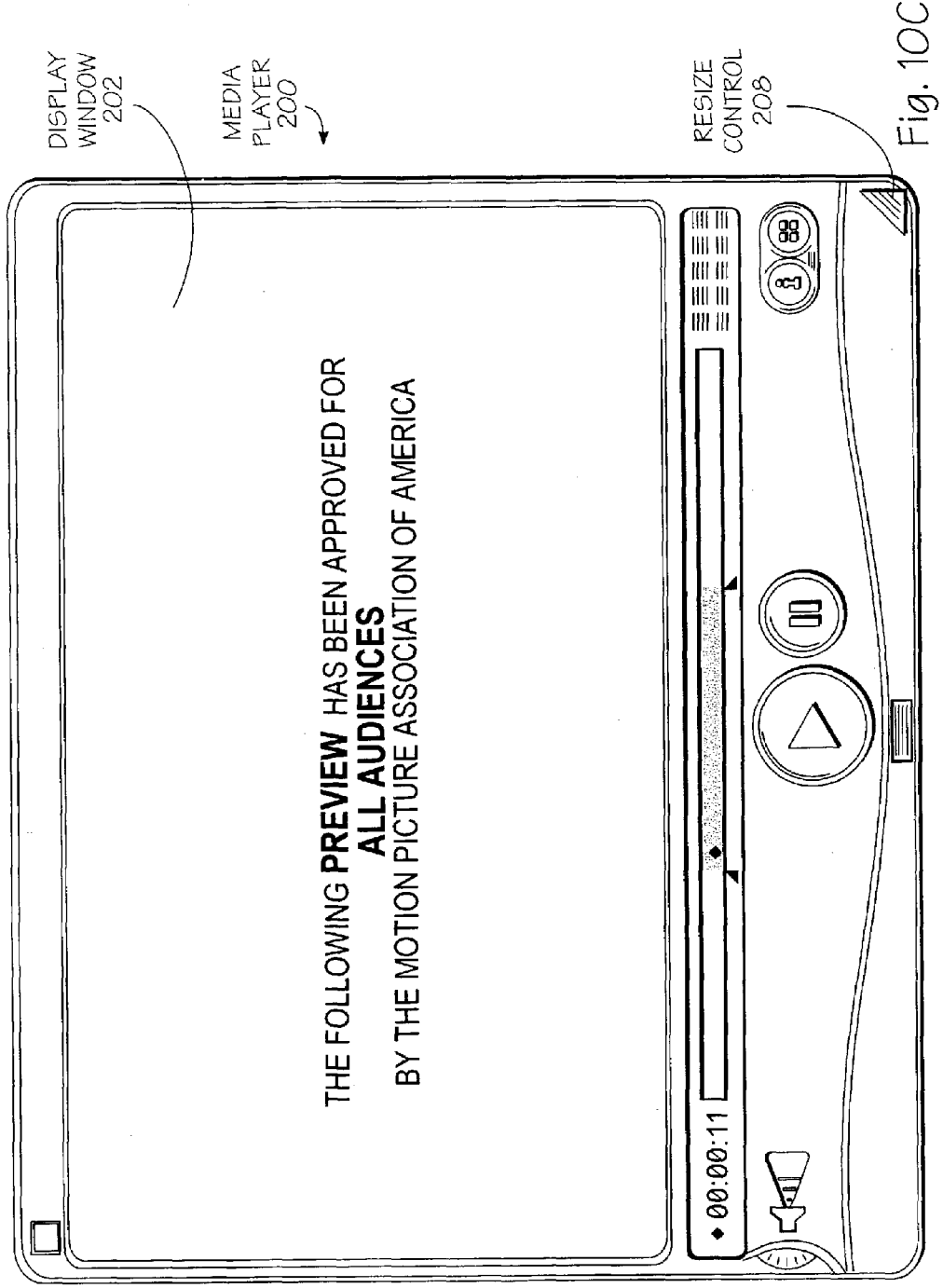

USER INTERFACE FOR PRESENTING MEDIA INFORMATION

This application is a continuation application of U.S. patent application Ser. No. 09/293,507, filed Apr. 15, 1999 now U.S. Pat. No. 6,538,665.

FIELD OF THE INVENTION

The present invention relates to user interfaces for processing (e.g., generating, storing, transmitting and/or receiving, playing back/displaying, editing, referencing, etc.) media information, such as time-based media data representing video and/or audio. In particular, the present invention provides an interactive digital processing system-controlled graphical user interface that provides functionality for play back or other processing of time-based and still media data.

INTRODUCTION AND BACKGROUND

There are a number of file structures used today to store time-based media: audio formats such as AIFF, video formats such as AVI, and streaming formats such as RealMedia. They are different at least in part because of their different focus and applicability. Some of these formats are sufficiently widely accepted, broad in their application, and relatively easy to implement, that they are used not only for content delivery but also as interchange formats such as the QuickTime™ file format. The QuickTime format is used today by many web sites serving time-based data; in many authoring environments, including professional ones; and on many multimedia CD ROM (e.g., DVD or CD-I) titles.

The QuickTime media layer supports the relatively efficient display and management of general multimedia data, with an emphasis on time-based material (video, audio, video and audio, motion graphics/animation, etc.). The media layer uses the QuickTime file format as the storage and interchange format for media information. The architectural capabilities of the layer are generally broader than the existing implementations, and the file format is capable of representing more information than is currently demanded by the existing QuickTime implementations. Furthermore, the QuickTime file format has structures to represent the temporal behavior of general time-based streams, a concept which covers the time-based emission of network packets, as well as the time-based local presentation of multimedia data.

Given the capabilities and flexibility provided by time-based media formats, it is desirable to provide a user interface that provides suitable functionality and flexibility for playback and/or other processing of time-based media in such formats.

Prior user interfaces for controlling the presentation of time-based media include user interfaces for the RealPlayers from RealNetworks of Seattle, Wash., user interfaces for the QuickTime MoviePlayers from Apple Computer, Inc. of Cupertino, Calif., and user interfaces for the Windows Media Players from Microsoft Corporation of Redmond, Wash. Also, there are a number of time-based media authoring systems which allow the media to be created and edited, such as Premiere from Adobe Systems of San Jose, Calif.

These prior user interfaces typically use "pop-up" or pull-down menus to display controls (e.g. controls for controlling playback) or to display a list of "favorites" or "channels" which are typically predetermined, selected media (e.g. CNN or another broadcast source which is remotely located or a locally stored media source). While these lists or menus may be an acceptable way of presenting this information, the lists or menus may not be easily alterable and the alteration operations are not intuitive. Further, these lists or menus are separate from any window presenting the media and thus do not appear to be part of such window.

In some prior user interfaces, the various controls are displayed on a border of the same window which presents the media. For example, a time bar may be displayed on a window with controls for playback on the same window. While these controls are readily visible and available to a user, a large number of controls on a window causes the window to appear complex and tends to intimidate a novice user.

Some prior user interfaces include the ability to select, for presentation, certain chapters or sections of a media. Laser disc players typically include this capability which may be used when the media is segmented into chapters or sections. A user may be presented with a list of chapters or sections and may select a chapter or section from the list. When this list contains a large number of chapters or sections, the user may scroll through the list but the speed of scrolling is fixed at a single, predetermined rate. Thus, the user's ability to scroll through a list of chapters is limited in these prior user interfaces.

Certain prior user interfaces which allow for editing of time-based media may include the ability of selecting a range of time of the media for editing in that selected range. However, these interfaces do not allow for the playback, through a single playback button, of a selected range of a media which has been selected by at least one dragging action of an indicator.

SUMMARY OF THE INVENTION

The present invention relates to various aspects for controlling and/or presenting information concerning time-based media, such as a movie.

In one aspect of the invention, an exemplary method of the invention allows for the selection of a presentation of time-based media. In this method, a graphical representation of a time line for the time-based media is displayed, and a graphical representation of a current time is also displayed along the graphical representation of the time line. A start graphical indicator and a stop graphical indicator is also displayed along the graphical representation of the time line. The start graphical indicator or the stop graphical indicator may be positioned, for example, by dragging, either of the indicator along the graphical representation of the time line to select a portion of the time-based media for presentation. In one typical example of this method, both the start graphical indicator and the stop graphical indicator may be dragged along the time line to select a portion of a movie for presentation.

According to another aspect of the present invention, a method is provided for generating an interface for display for controlling the processing of time-based media data. A first set of data representing a graphical user interface as a primary window is generated and displayed. A second set of data representing a drawer window is generated and contains objects such as representations (e.g. icons) of "favorites" or "channels" media. In a first display state, the drawer window is at least partially overlapped by the primary window, and in a second display state is at least partially view able. In one embodiment, the drawer window appears to be part of the primary window and slides under the primary window when the drawer window is closed. In one embodiment, when the primary window is moved, the drawer window moves with the primary window as part of the primary window. The drawer window, in one embodiment, provides a plurality of locations which are fixed and predetermined, each for displaying a time-based media icon (e.g. a thumbnail image) associated with a time-based media file. In one embodiment, the thumbnail image represents a favorite or channel time-based media, and the user may drag an icon into the drawer window or out of the drawer window in order to alter the contents of the drawer window.

According to another aspect of the present invention, a method is provided for generating a graphical user interface for control of processing of time-based media data. In an exemplary method according to this aspect, a first set of data representing the graphical user interface is generated and displayed as a primary window. A second set of data representing an auxiliary drawer window is generated for display. In a first display state, the auxiliary drawer window is at least partially overlapped by the primary window and in a second display state it is at least partially view able. In one embodiment, the auxiliary drawer window appears to be part of the primary window and slides under the primary window when the auxiliary drawer is closed. When the primary window is moved in one embodiment, the auxiliary drawer window moves with the primary window as part of the primary window. In one embodiment, the auxiliary drawer window provides information relating to a time-based media file or controls for the control of a time-based media file.

According to another aspect of the present invention, a method is provided for controlling a graphical user interface which processes time-based media information. In one exemplary method of this aspect, input to change a portion of the graphical user interface is detected. This portion indicates time relating to the time-based media. An input speed of the input is determined and a rate at which to change the portion is also determined, where the rate is dependent on the input speed. The information displayed in the portion is changed according to the rate which is dependent upon the input speed. In one particular example according to this aspect of the invention, a chapter selection mechanism allows the user to select different chapters within a movie by causing a chapter display area to have chapters scroll within the area. The speed of scrolling is controlled by the movement of a cursor or other input.

BRIEF DESCRIPTION OF THE DRAWINGS

FIG. 3A shows a GUI (graphical user interface), and in particular, a time-based media player display window for displaying, controlling, and/or otherwise processing time-based media data, according to one embodiment of the invention.

FIG. 7A illustrates an adaptive chapter display/control, according to one embodiment of the invention.

FIG. 7B illustrates an adaptive chapter display/control, according to one embodiment of the invention.

FIGS. 10A-10C illustrate resizing a time-based media player generated as a GUI and/or a display window for displaying time-based images, according to one embodiment of the invention.

DETAILED DESCRIPTION

The present invention provides methods and apparatuses for processing media information. In one embodiment of the present invention, a graphical user interface (GUI) is provided that includes a number of features for referencing, playing back, and/or otherwise processing time-based media information (e.g., video, animated graphics, and/or audio, etc.). In one embodiment, the GUI, also sometimes referred to as a media player, provides functionality for processing time-based media in the QuickTime format, such as Quick-Time "movies," which typically include audio and motion video information. Although the present invention is described with reference to the QuickTime media data format, it will be appreciated that the invention may also be used in a variety of environments, in conjunction with other media data formats, and with various types of data processing systems having a number of different types of architectures. Thus, the invention should not be limited to the systems, media data formats, or architectures disclosed herein, which are meant only to provide an understanding of the invention, whose scope is defined by the claims which follow.

Hardware Overview

Figure 1:
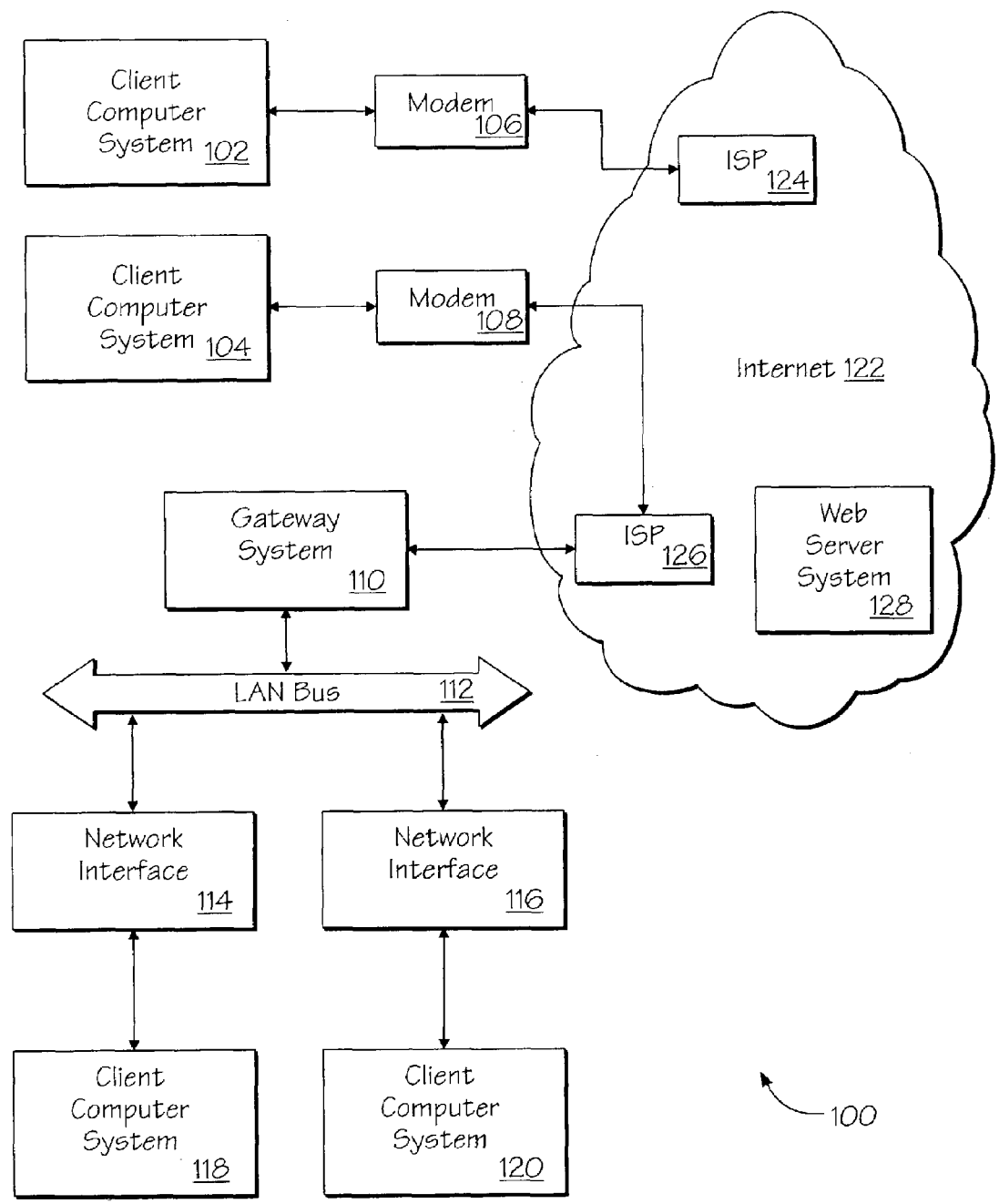
FIG. 1 is a diagram of a network of computer systems in which media data may be processed, according to one embodiment of the present invention.

FIG. 1 is a diagram of a network of computer systems in which media data may be processed, according to one embodiment of the present invention. As shown in FIG. 1, a network 100 includes a number of client computer systems that are coupled together through an Internet 122. It will be appreciated that the term "Internet" refers to a network of networks. Such networks may use a variety of protocols for exchange of information, such as TCP/IP, ATM, SNA, SDI, etc. The physical connections of the Internet and the protocols and communication procedures of the Internet are well known to those in the art.

Access to the Internet 122 is typically provided by Internet service providers (ISPs), such as the ISP 124 and the ISP 126. Users on client systems, such as the client computer systems 102, 104, 118, and 120, generally obtain access to the Internet through Internet service providers, such as ISPs 124 and 126. Access to the Internet may facilitate transfer of information (e.g., email, text files, media files, etc.) between two or more digital processing systems, such as the client computer systems 102, 104, 118, and 120 and/or a Web server system 128. For example, one or more of the client computer systems 102, 104, 118, and 120 and/or the Web server 128 may provide media data (e.g., video and audio, or video, or audio) to another one or more of the client computer systems 102, 104, 118, and 120 and/or the Web server 128. For example, in one embodiment of the invention, one or more of the client computer systems 102, 104, 118 and 120 may request play-back of time-based media data that may be stored at a remote location, such as the Web server 128. In the case of remote storage, the data may be transferred as a file (e.g. downloaded) and then played back after transferring the file or, if a streaming media system is available, the data may be played back at the client while the transfer occurs. In another embodiment, the requested time-based media data may be stored locally at the client computer system 102, 104, 118, and/or 120. In the case of local storage, the client system may play back time-based media using a playback system (e.g. a QuickTime Player) without requiring a network connection.

The Web server 128 typically includes at least one computer system to operate with one or more data communication protocols, such as the protocols of the World Wide Web, and as such, is typically coupled to the Internet 122. Optionally, the Web server 128 may be part of an ISP which may provide access to the Internet and/or other network(s) for client computer systems. The client computer systems 102, 104, 118, and 120 may each, with appropriate web browsing software, access data, such as HTML documents (e.g., Web pages), which may be provided by the Web server 128. Such data may provide media, such as QuickTime movies, which may be played back/presented by the client computer systems 102, 104, 118, and 120.

The ISP 124 provides Internet connectivity to the client computer system 102 via a modem interface 106, which may be considered as part of the client computer system 102. The client computer systems 102, 104, 118, and 620 may be a conventional data processing system, such as a Macintosh computer, a "network" computer, a handheld/portable computer, a Web TV system, or other types of digital processing systems (e.g., a cellular telephone having digital processing capabilities).

Similarly, the ISP 126 provides Internet connectivity for the client computer systems 104, 118 and 120. However, as depicted in FIG. 1, such connectivity may vary between various client computer systems, such as the client computer systems 102, 104, 118, and 120. For example, as shown in FIG. 1, the client computer system 104 is coupled to the ISP 126 through a modem interface 108, while the client computer systems 118 and 120 are part of a Local Area Network (LAN). The interfaces 106 and 108, shown as modems 106 and 108, respectively, may represent an analog modem, an ISDN modem, a cable modem, a satellite transmission interface (e.g., "Direct PC"), a wireless interface, or other interface for coupling a digital processing system, such as a client computer system, to another digital processing system. The client computer systems 118 and 120 are coupled to a LAN bus 112 through network interfaces 114 and 116, respectively. The network interfaces 114 and 116 may be an Ethernet-type, Asynchronous Transfer Mode (ATM), or other type of network interface. The LAN bus is also coupled to a gateway digital processing system 110, which may provide firewall and other Internet-related services for a LAN. The gateway digital processing system 110, in turn, is coupled to the ISP 126 to provide Internet connectivity to the client computer systems 118 and 120. The gateway digital processing system 110 may, for example, include a conventional server computer system. Similarly, the Web server 128 may, for example, include a conventional server computer system.

The system 100 may allow one or more of the client computer systems 102, 104, 118, and 120 and/or the Web server 628 to provide time-based media data (e.g., video and audio, or video, or audio) to another one or more of the client computer systems 102, 104, 118, and 120 and/or the Web server 128. As described below, the present invention facilitates playing back and other functionality for processing the media data.

Figure 2:
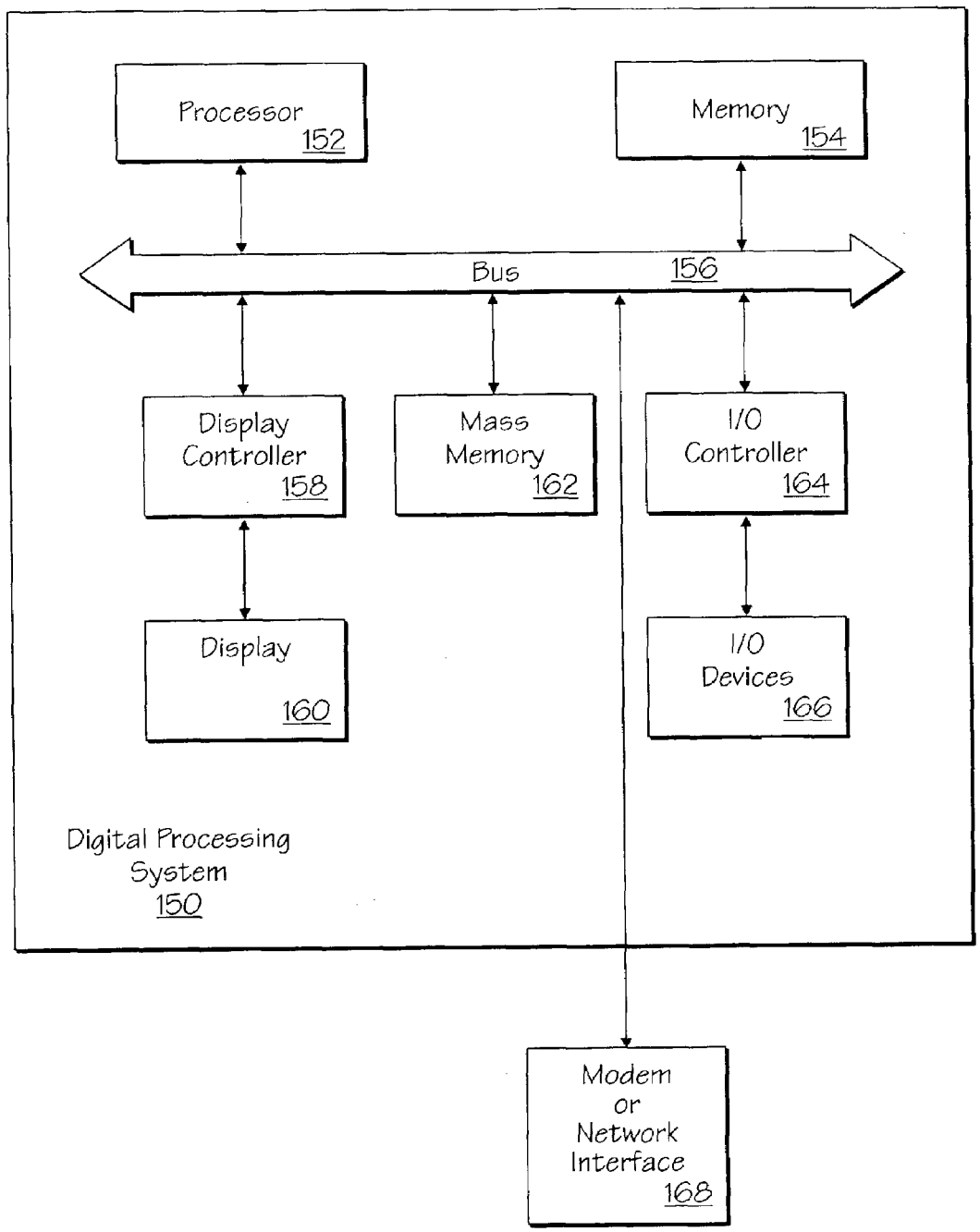
FIG. 2 is a block diagram of a digital processing system which may be used to process time-based media data, in accordance with one embodiment of the present invention.

FIG. 2 is a block diagram of a digital processing system which may be used to process time-based media data, in accordance with one embodiment of the present invention. For example, the digital processing system 150 shown in FIG. 2 may be used as a client computer system (e.g., the client computer system 102, 104, 118, and/or 120), a Web server system (e.g., the Web server system 128), a conventional server system, etc. Furthermore, the digital processing system 150 may be used to perform one or more functions of an Internet service provider, such as the. ISP 124 or 126. The digital processing system 150 may be interfaced to external systems through a modem or network interface 168. It will be appreciated that the modem or network interface 168 may be considered as part of the digital processing system 150. The modem or network interface 168 may be an analog modem, an ISDN modem, a cable modem, a token ring interface, a satellite transmission interface, a wireless interface, or other interface(s) for providing a data communication link between two or more digital processing systems.

The digital processing system 150 includes a processor 152, which may represent one or more processors and may include one or more conventional types of such processors, such as a Motorola PowerPC processor, an Intel Pentium (or x86) processor, etc. A memory 154 is coupled to the processor 152 by a bus 156. The memory 154 may be a dynamic random access memory (DRAM) and/or may include static RAM (SRAM). The processor may also be coupled to other types of storage areas/memories (e.g., cache, Flash memory, disk, etc.), which could be considered as part of the memory 154 or separate from the memory 154.

The bus 156 further couples the processor 152 to a display controller 158, a mass memory 162, the modem or network interface 168, and an input/output (I/O) controller 164. The mass memory 162 may represent a magnetic, optical, magneto-optical, tape, and/or other type of machine-readable medium/device for storing information. For example, the mass memory 162 may represent a hard disk, a read-only or writeable optical CD (e.g., CD ROM, DVD), etc. The display controller 158 controls in a conventional manner a display 160, which may represent a cathode ray tube (CRT) display, a liquid crystal display (LCD), a plasma display, or other type of display device. The I/O controller 164 controls I/O device(s) 166, which may include one or more keyboards, mouse/trackball or other pointing devices, microphones (for speech recognition capabilities), magnetic and/or optical disk drives, printers, scanners, digital cameras, microphones, etc.

It will be appreciated that the digital processing system 150 represents only one example of a system, which may have many different configurations and architectures, and which may be employed with the present invention. For example, Macintosh and other systems often have multiple busses, such as a peripheral bus, a dedicated cache bus, etc. On the other hand, a network computer, which may be used as a digital processing device of the present invention, may not include, for example, a hard disk or other mass storage device, but may receive routines and/or data from a network connection, such as the modem or interface 168, to be processed by the processor 152. Similarly, a Web TV system, which is known in the art, may be considered to be a digital processing system of the present invention, but such a system may not include one or more I/O devices, such as those described above with reference to I/O device(s) 166. Additionally, a portable communication and data processing system, which may employ a cellular telephone and/or paging capabilities, may be considered a digital processing system which may be used with the present invention.

In the system 150 shown in FIG. 2, the mass memory 162 (and/or the memory 154) may store time-based media (e.g., video, audio, movies, etc.) which may be processed according to the present invention. Alternatively, media data may be received by the digital processing system 150, for example, via the modem or network interface 168, and stored and/or presented by the digital processing system 150, for example, via the display 160 and/or I/O device(s) 166, which may include audio speakers, headphones, and/or other media playback output devices. In one embodiment, packetized media data may be transmitted across a data communication network, such as a LAN and/or the Internet, in accordance with the QuickTime format to be processed by the system 150 in accordance with the present invention. On the other hand, the digital processing system 150 may locally store time-based media data in the mass memory 162, the memory 164, and/or another machine-readable medium accessible by the digital processing system 150, as well as executable code that provides functionality for processing time-based media data in accordance with the present invention.

Overview of One Embodiment of the Invention

FIG. 3A shows a GUI, and in particular, a time-based media player display window for displaying, controlling, and/or otherwise processing time-based media data, according to one embodiment of the invention.

As shown, a time-based media player (media player) 200, which is typically displayed as a window on a display of a computer or other digital processing system, includes a number of display and control functions for processing time-based media data, such as a QuickTime movie. The player window 200 may be "closed" using a close box 222 (e.g. the user may "click" on this box to close the window by positioning a cursor on the box and depressing and releasing a button, such as a mouse's button while the cursor remains positioned on the close box).

The media player 200 includes a movie display window 202 for displaying a movie or other images associated with time-based media. In addition, a time/chapter display and control region 204 of the media player 200 provides functionality for displaying and/or controlling time associated with a particular time-based media file (e.g., a particular movie processed by the player 200). As described below, a time-based media file may be sub-indexed into "chapters" or sections which correspond to time segments of the time-based media file, and which chapters may also be titled. As such, a user may view or select a time from which, or time segment in which, to play back a time-based media file. Such selection, as described below, may be based on a particular chapter name and/or a particular time relative to the time-length of the time-based media file.

The media player 200 includes a number of other mechanisms for controlling playback, display, and/or other processing of time-based media. For example, a volume dial 220 controls the audio output level (e.g., through speakers, headphones, or other audio output device). In one embodiment, a cursor controlled through a pointing device (e.g., a mouse, trackball, touchpad, arrow keys of a keyboard, etc.) or speech recognition enables a user to control the dial 220, as well as other features of the media player 200. For example, in one embodiment, a user may place the cursor upon the volume dial 200 using a pointing device, and control the audio output level/volume by holding down the "click" button of the pointing device (to select or "activate" the volume dial icon 220) and then moving the cursor up or down to change the level/volume up or down, respectively. In one embodiment, a volume level display/control 218 displays the current volume level by highlighting on the display one or more graphical "level lines," wherein when more lines are highlighted, the higher the volume. Thus, as the dial 220 is "turned up" to increase the audio output level, more lines will become highlighted, and conversely, when the dial 220 is "turned down" to decrease the volume, less lines become highlighted in the volume level display control 218. In the embodiment depicted in FIG. 3A, the user may also vary the audio output level/volume by placing the cursor on the volume level/display control 218, activating the icon (e.g., by pressing and holding a mouse or other pointing device selection/click button), and moving the cursor to the right (to increase the volume) or to the left (to decrease the volume), in which case the dial 220 will turn up or down, respectively, while the level lines of the volume level/display control 218 will be highlighted accordingly. Also, in one embodiment, the user may select (e.g. "click" on) the audio icon 217 to turn off the audio portion of a presentation. As shown, the media player 200 also includes a play button 216 and a pause button 212, which allow play back and pausing of a (currently selected) time-based media file.

As described below, the present invention provides secondary or "drawer" or "panel" or tray windows to be "opened" from the primary or media player 200 window. As such, the drawer or panel or tray windows, when opened or closed in response to user input, for example, will resemble drawers that open or close from the media player 200 window, as shown in FIGS. 4, 5A, 6A and 6B. These drawer windows (e.g. the favorite/channel drawer window 230), in one embodiment, are part of the primary window and are moved with the primary window and are opened or closed with the primary window. That is, when the primary window is moved around the desktop (on the display screen), the drawer window is moved with the primary window and appears attached to the primary window. When the primary window is first opened, the handle portion of the drawer window is opened and is displayed and appears attached to the primary window. When the primary window is closed (e.g. removed from the display screen), the drawer window is closed. The drawer window, in one embodiment, typically includes a handle portion which includes a drawer control (e.g. drawer control 214) which may be used to slide the drawer window open (e.g. display favorite/channel icons) or, if the drawer window is opened, to close the drawer window so that only the handle portion, typically attached to the primary window on an edge of the primary window, is displayed. The handle portion of the drawer window may also include other controls, such as a resize control 208. In one embodiment, objects, such as icons representing media (e.g. "favorites" or "channels"), may be selected from regions outside of the drawer window (e.g. icons on the desktop may be selected) and may be then dragged to a predetermined (e.g. "tiled") region inside of the drawer window. This causes the selected object, in one exemplary embodiment, to become a "favorite" or "channel." Similarly, an object (e.g. an icon representing a favorite or channel media) may be selected within the drawer window and dragged outside of the window (e.g. dragged to the desktop or to a folder on the desktop or dragged to an icon representing a trash or waste receptacle or function). This has the effect of either creating an alias or short cut for the selected object (when dragged to a folder) or deleting the object from the drawer window. Thus, the drawer window, in one embodiment, acts as a desktop window into which, and from which, objects (e.g. an icon of a favorite or a channel) may be dragged and it appears as part of a primary window which presents media data (e.g. displays still images or movies or plays back audio only, etc.).

The drawers or trays of the media player 200 provide additional functionality or information in association with play back or other processing of a time-based media file. For example, the tray associated with a controls button 206, as described below, includes a number of other mechanisms to control play back and other processing of a time-based media file, which mechanisms may include, for instance, audio balance, bass, and treble controls, forward/reverse scan controls, step back/forward controls, etc. As such, a user may activate the controls button 206 (e.g., by clicking/double clicking with a pointing device while the cursor is on the controls button 206), and the control panel will, in one embodiment, "slide" from the media player 200 window appearing as if it was a drawer hidden/closed under the media player 200. Similarly, a favorite/channel drawer control 214, when activated by the user (e.g., using a pointing device), opens a favorite/channel drawer which is described in further detail below. Finally, an information button 210 opens an information tray 250 when activated and this tray will, in one embodiment, slide from the media player 200, appearing as if it was a drawer hidden/closed under the media player 200.

The size of the media player 200 and/or the motion video display window 202 may also be varied by activating a resize control 208. In one embodiment, the media player 200 is displayed at a default minimum size. In this embodiment, when the resize control 208 is activated, two animated rectangles are displayed: one animated rectangle represents the size of the motion display window 202 (with any image displayed therein) and the other animated rectangle represents the media player 200 window. Each animated rectangle represents the currently selected size of one of these two windows, and thus each animated rectangle indicates the size of the window if the currently selected size is ultimately selected by the user. As such, the resize control 208 may be "dragged" by the cursor to resize the motion video display window 202 (and any image displayed thereby) without changing the size of the window 200 until the size of window 202 increases to a threshold size, which in one embodiment, corresponds to substantially the edges of the media player 200 or a window 202 of dimensions 320×240 pixels. When this occurs, an attempt to further enlarge the motion video display window 202 will enlarge the media player 200 window and the window 202 together. In other words, if the outer window rectangle is larger than the minimum (default size), the two rectangles grow and shrink proportionally together. However, if the user attempts to shrink the media player 200 window's animated rectangle below the minimum size, only the motion video display window 202 (and its animated rectangle) will shrink, and the size of the media player 200 window will remain unchanged from the minimum size.

Figure 3B:
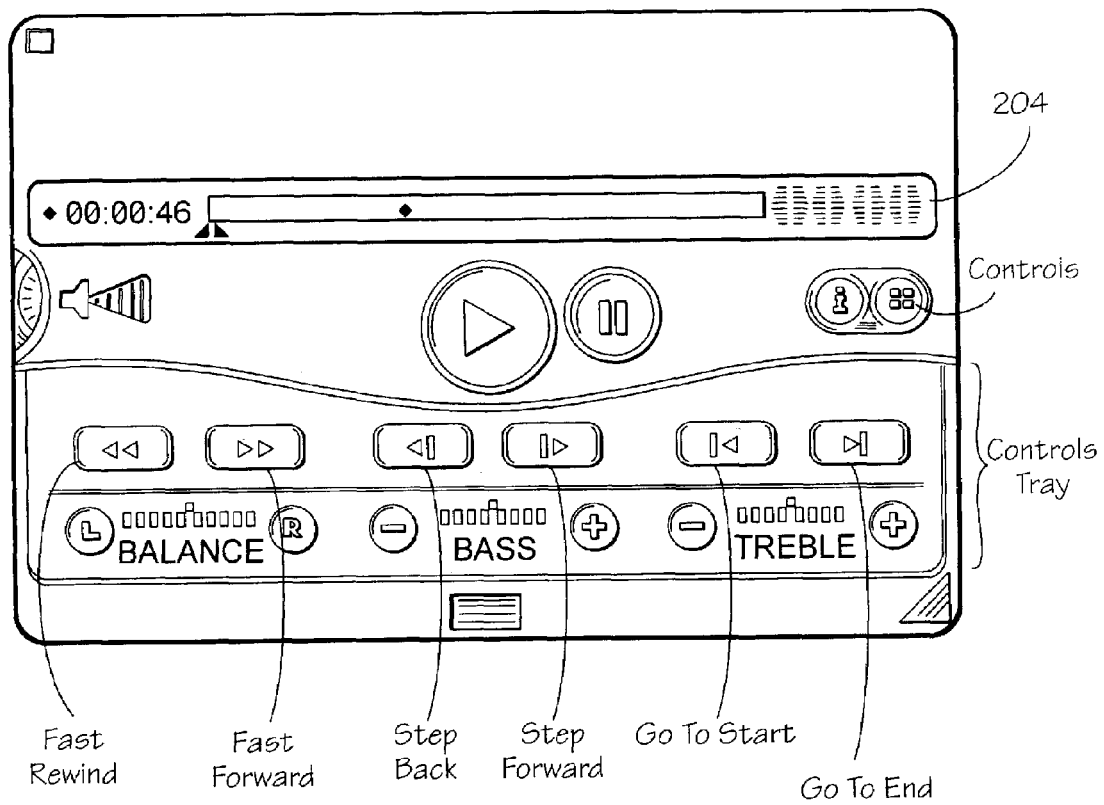
FIG. 3B shows an example of an audio-only window for a time-based media player.

FIG. 3B shows an example of an audio-only player window. The player window of FIG. 3B may include the same controls and drawers as the player of FIG. 3A except that only audio media is played back through the player window of FIG. 3B.

It will be appreciated that the media presented through the various interfaces of the invention is not limited to movies with audio, or movies without audio, or audio-only time-based media (e.g. speeches or music), or still images or combinations of these media. It also will be appreciated that the drawers may contain any number of different types of controls or, generally, objects associated with media or control of the presentation of media. These controls in the drawers allow a user to manipulate and design a presentation of media or otherwise control it. A drawer may contain a combination of controls (e.g. control buttons) and favorites or channels of media, although in the embodiment shown in FIGS. 4, 6A and 6B, the controls are displayed in one drawer separately from a drawer containing favorites and/or channels. It will also be appreciated that, in one instance, the favorites are merely preselected media (either locally stored or received from a remote site) which the user (or the system at the user's request or the system on its own) has decided to save for future use by designating the media as a favorite (which is similar to the manner in which a web site is selected as a favorite or is selected as a bookmark in a Web browser such as Microsoft's Internet Explorer or Netscape's Navigator). It will also be appreciated that a player window (e.g. window 200) may have multiple drawers for favorites or channels; for example, there may be two separate drawers for favorites and two separate drawers for channels. The controls may also be placed in separate drawers.

Favorite/Channel Drawer

Figure 4:
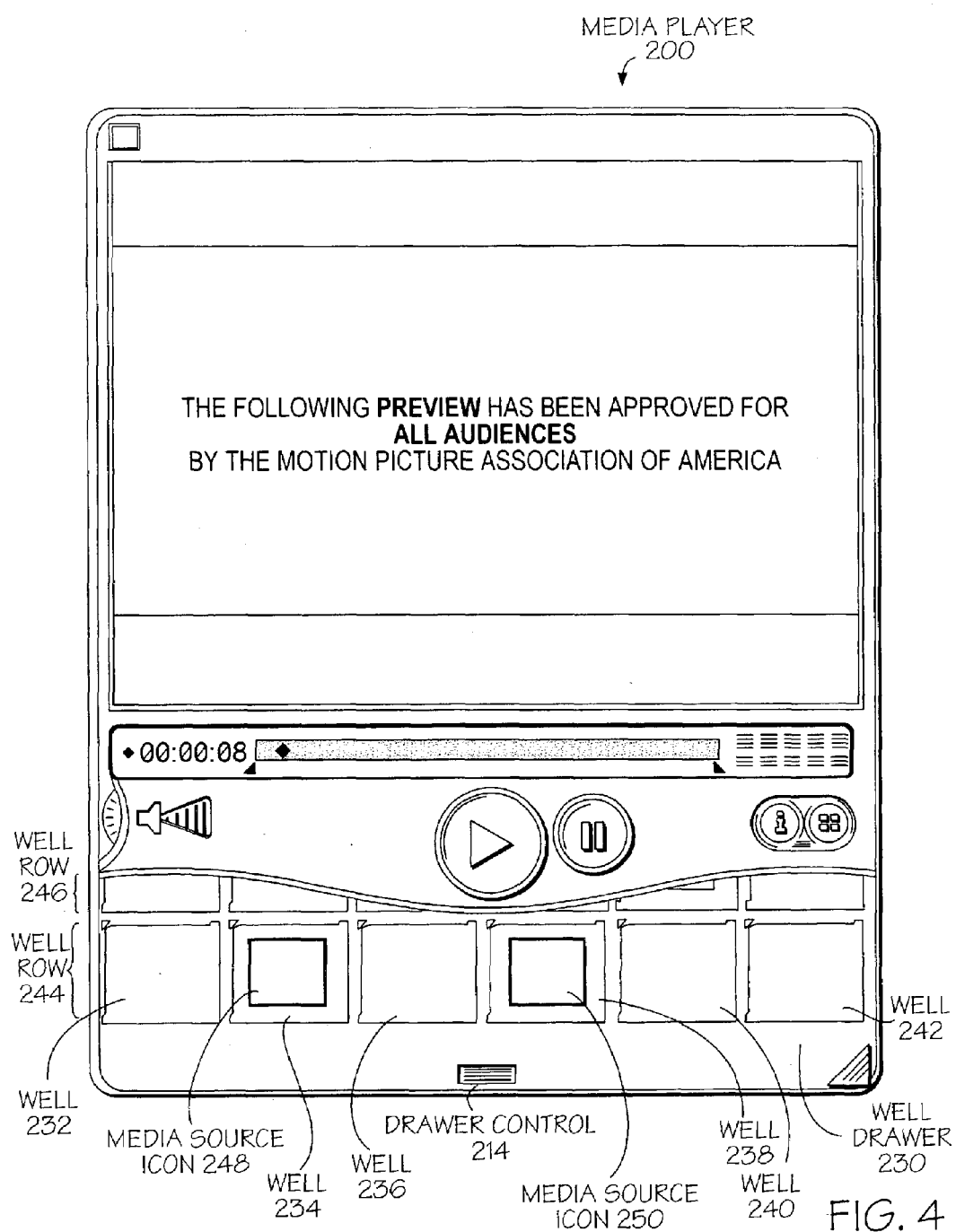
FIG. 4 illustrate the time-based media player of FIG. 3A depicting a favorite/channel drawer that is partially open (i.e., partially displayed), according to one embodiment of the invention.

Now referring to FIG. 4, the time-based media player of FIG. 3A is shown depicting a favorite/channel drawer that is partially open, according to one embodiment of the invention. In particular, the media player 200 is shown along with a favorite/channel drawer 230. In one embodiment, in response to a user input with respect to the favorite/channel drawer control 214, which may involve activation of the favorite/channel drawer control 214 by placing a cursor thereon and clicking and holding a pointing device (e.g., a mouse button), the favorite/channel drawer 230 may be "opened" as a secondary drawer window with respect to the media player window 200, such that it appears to be at least partially overlapped by and attached to the media player 200. Prior to being opened as a secondary window, a handle of the secondary window is displayed next to the primary window, and this handle remains attached to the secondary window after the secondary window is opened. By moving the cursor up and down while the favorite/channel drawer control 214 is activated (e.g. the cursor is placed over the control 214 and the mouse's button is held depressed), a user may close and open the favorite/channel drawer (window) 230 to be displayed in various proportions relative to the media player 200 window. Examples of mechanisms and terminology for display interfaces, cursor control, and drawer user interfaces are described in U.S. Pat. No. 5,745, 096, issued on Apr. 28, 1998, and entitled, "Desk Drawer User Interface," which is hereby incorporated by reference herein. The favorite/channel drawer 230 may also be referred to as a media drawer.

Figure 5A:
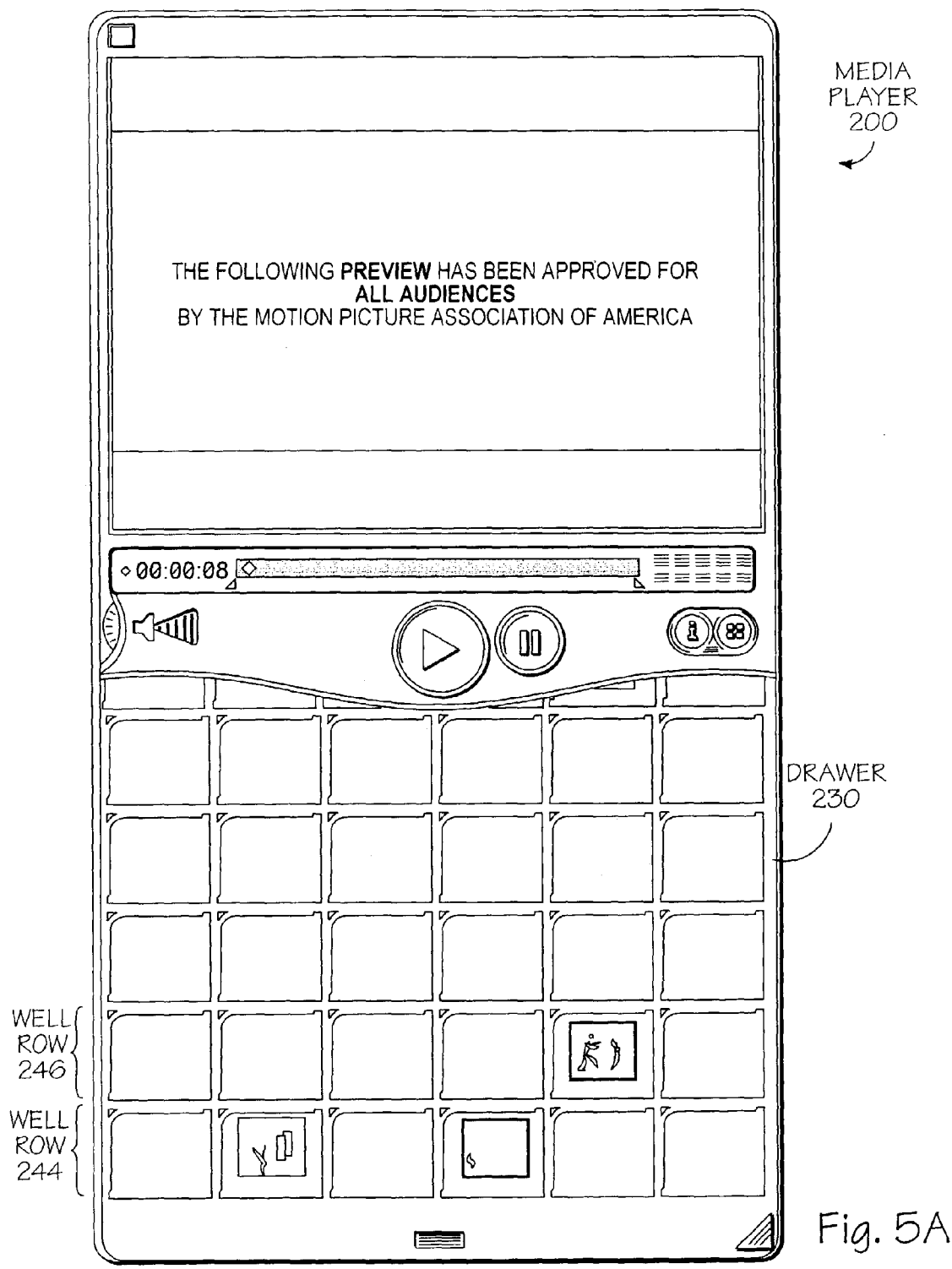
FIG. 5A is a diagram of a time-based media player providing a favorite/channel drawer generated as a GUI, according to one embodiment of the invention.

Typically, the media player window 200 is displayed as a primary window, for example, on a desktop window which may be moved around the desktop (e.g. moved by dragging the window around the desktop). The media player window may include a trigger region, such as the drawer control 214, for controlling display of a secondary window, the drawer 230. It will be appreciated that while the drawer 230 is referred to as a secondary window it is effectively, in one embodiment, part of the primary window in that it is attached to the primary window and moves with the primary window as it is moved around the desktop. A cursor control device (sometimes also referred to as a pointing device) may be used to control a cursor position on a display. Alternatively, speech recognition may be used to open and close the favorite/channel drawer. When the cursor is placed on a screen/display region of the trigger region and the region is selected (e.g., by depressing a mouse or other cursor select/activation input device) in a first state of the favorite/channel drawer window, in which state the contents of the drawer window are not displayed (e.g., as shown in FIG. 3A), a user may drag the cursor (e.g., in a downward direction) to "open" or reveal for display the contents of the drawer or a portion thereof, in which case the drawer is in a second (or displayed/open) state. This second state of the drawer window is shown in FIGS. 4 and 5A. The drawer may slide open with a sliding (e.g. nearly continuous) animation or may "pop" open from a closed state. Similarly, the drawer may slide closed with a sliding animation or may pop closed without any sliding animation. The cursor can further be controlled to place time-based media source icons into the drawer (e.g. by dragging an icon from a desktop or folder on the desktop to the drawer), remove time-based media source icons from the drawer, rearrange time-based media source icons between locations in the drawer or other windows, and/or select for playback a media file associated with an icon displayed in the drawer (e.g., by placing the cursor over that icon and activating the icon). As described below, the media player may also include auxiliary drawer windows which may be operated similarly to provide functionality and/or information relating time-based media data that may be processed by the GUI media player of the present invention.

In FIG. 4, the drawer 230 is shown partially opened to reveal a favorite/channel row 244 and a portion of a row 246. The favorite/channel row 244 comprises favorite/channel wells 232, 234, 236, 238, and 240. Each favorite/channel well represents, in one embodiment, a fixed, predetermined, tiled display location within the drawer 230 that may contain a reference (e.g., a display/cursor activated icon) to particular time-based media source, which in one embodiment may be a particular time-based media file or a particular time-based media channel. For example, as shown in FIG. 4, the well 234 contains a media source icon 248 and the well 238 contains a media source icon 250, each of which may reference a particular time-based media file or channel or may reference a non-time-based media file. Each row of the drawer includes tiled compartments, each of which is designed to hold one media source icon. The filed compartments have a fixed, predetermined location, thereby preventing placement (in one embodiment) of a media source icon in an arbitrary location. Any attempt to drop an icon in an arbitrary location will result in the icon being placed into an available well (not already occupied by an icon). That is, the placement is restricted to the tiled (e.g. non-overlapping) locations. In one embodiment, the media player 200 may be generated and displayed on a client computer system, such as one shown in FIG. 1, and the media source icon 248 may reference a particular time-based media file, such as a QuickTime movie, that is stored locally by the client computer system or at a remote location (e.g., a Web server system) that provides the media file for play back (or other forms of presentation) by the media player 200 in response to a request. In one embodiment, such a play back request is performed by activating the media source icon 248 (e.g., by pointing the cursor thereon and clicking on it). For example, if the time-based media file comprises motion video, such will be displayed in the display window 202 after activating the associated media source icon. In one embodiment, when a source icon (e.g. icon 248) is activated, a highlighting is displayed around the edges of the well which contains the activated icon.

In addition, a media source icon, such as the media source icon 248, may reference a particular media channel, such as a news provider (e.g., CNN, Fox News, etc.), a major network (e.g., ABC, NBC, CBS, etc.), a shopping network, or another channel. Such channels correspond to sources that typically provide continuous time-based media information/programming via a media source, such as a Web server coupled to the Internet. Such a media source may stream media information into data packets that may transferred across a data processing network, such as the one shown in FIG. 1, according to the QuickTime or other media format and such data may not be stored locally (except perhaps for any ephemeral storage required for local playback). The address of such media is associated with the media source icon and is stored for quick access by the user.

Thus, wells may be filled with icons associated with files from the user's digital processing system (e.g., a file may be dragged from the desktop or other window/directory to a well in the drawer or a file menu associated with the drawer may be used to add an icon to a well in the drawer) or may be filled with icons (which may sometimes also be referred to as "bookmarks") associated with streamed time-based media provided by a remote (e.g., Web) system. In one embodiment, a user may subscribe to certain channels, media (Web) servers, etc., which will then provide the icons associated with the subscribed media source(s) into wells in the drawer and/or any other directory associated therewith. Thus, in one embodiment, the drawer may be altered by the user or automatically altered/updated by a remote server or other digital processing system by transferring, rearranging, adding, or deleting time-based media icons therein. In one embodiment, the favorite/channel drawer may contain icons associated with "favorite" media of the user.

In one embodiment, media source icons provide a graphical reference to the media source associated therewith. For example, a particular frame of a motion video may be used as a "thumbnail" to represent the media source (e.g., file, channel, etc.) associated therewith. As such, data (e.g., a frame) from a particular media file or other media source may be used to generate a media source icon in the drawer 230 to reference that particular media file. On the other hand, a media source icon may include text or symbols or other graphics or images to identify a media file or channel associated therewith. For instance, the logo/symbol associated with a particular news or network channel may be used as a media source icon that references that channel to play back time-based media provided thereby when that icon is activated.

In one embodiment, a particular time-based media icon may be highlighted graphically when selected (e.g., by placement of the cursor thereon and/or single clicking a pointing device thereon). Such highlighting, in one embodiment, includes providing a border around a selected time-based media icon. It will be appreciated that selection may, but does not always include, activation of the icon, the latter of which runs/loads the media (e.g. file or channel) associated with the icon. For example, in one embodiment, activating a particular time-based media icon is performed by selecting and then clicking that icon, which in turn causes the time-based media player 200 to play the time-based media file associated with that icon. In one embodiment, the drawer 230 may slide closed after a source icon in a channel has been selected for presentation (e.g. displaying video and reproducing the associated audio).

FIG. 5A is a diagram of a time-based media player providing a favorite/channel drawer generated as a GUI, according to one embodiment of the invention. In particular, FIG. 5A shows the drawer 230 opened to a greater extent than shown in FIG. 4, for example, to reveal several well rows, including the well rows 244 and 246, the latter of which was partially hidden in the view of the media player 200 shown in FIG. 4. In one embodiment, the amount of the drawer 230 which is visible is controlled by the user. In one embodiment of the invention, selected wells or well rows, such as the well rows 244 and/or 246, may be reserved for certain media sources, such as certain favorites or channels of media provided by a media server. On the other hand, other wells may be freely utilized to store media icons. In one embodiment, time-based media icons may be transferred as icons and/or file names associated with time-based media sources from other locations/directories (e.g., a desktop or other window) of a digital processing system to a well of the drawer; transferred from one well to another well within a drawer; and/or transferred from a drawer to another location/directory of the digital processing system. In one embodiment, known cursor dragging methods may be employed to facilitate such transfers.

Figure 5B:
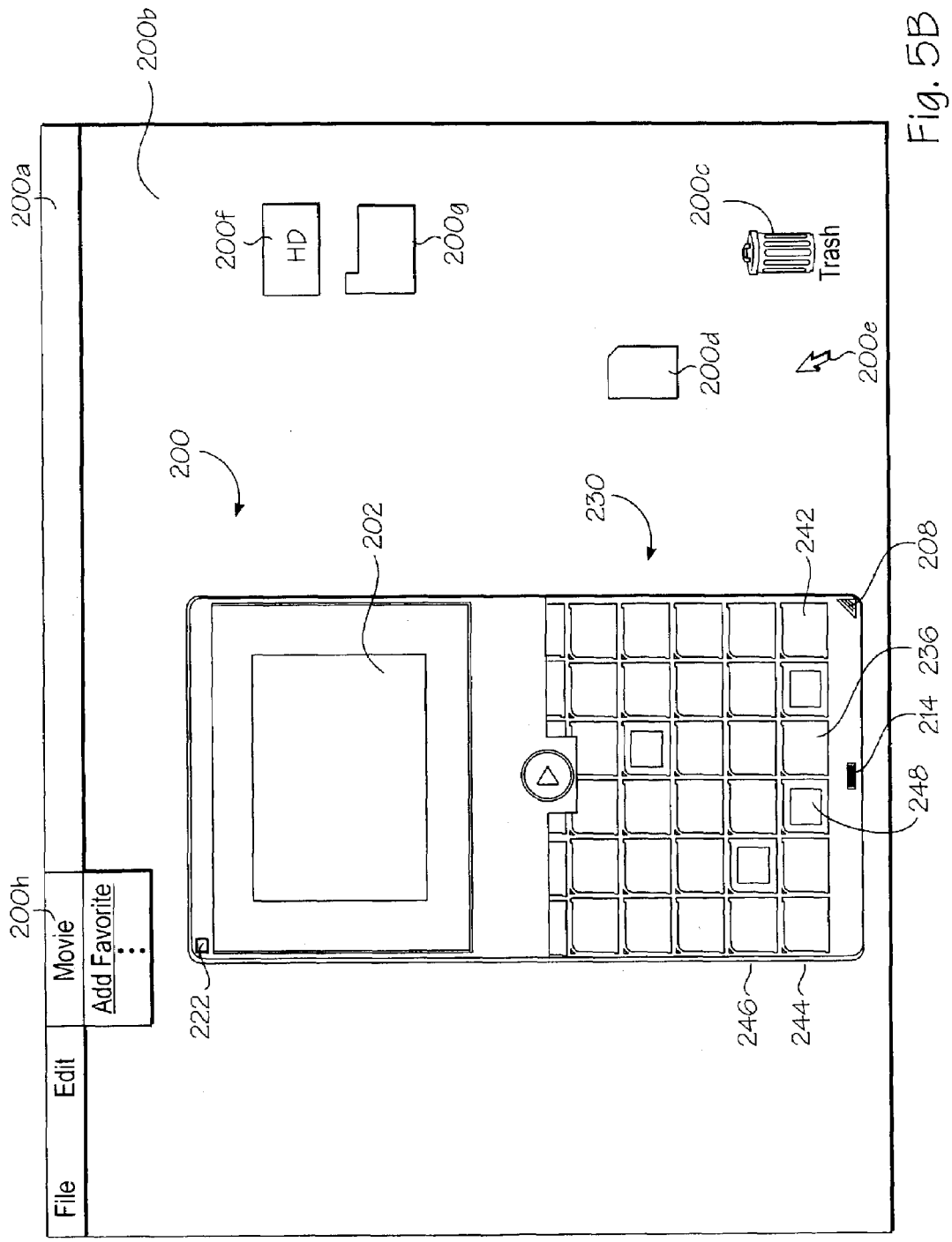
FIG. 5B shows an example of a user interface for altering the icons in a drawer of a player window according to one embodiment of the invention.

FIG. 5B shows an example of a graphical user interface according to the present invention which may be displayed on a display screen of a computer system. This interface includes a desktop 200b and a menu bar 200a having pull down menus, such as pull down menu 200h. The desktop 200b includes an icon 200f for a hard disk and an icon 200g for a folder as well as an icon for a media document 200d and an icon for a trash can 200c. A cursor 200e is also displayed on the desktop in the vicinity of the media player 200. The media player 200 includes a close box 222 and a display window 202 for showing images. Below the window 202 is the drawer 230 which has been opened to show four rows of wells, including rows 246 and 244. Four source media icons are shown in the drawer 230. A handle below the rows includes the drawer control 214 and the resize control 208. FIG. 5B will now be used to describe various processes for altering the contents of the drawer 230. A media source icon may be added to the drawer 230 by dragging the icon from the desktop or from a folder or from the hard disk icon into a well in the drawer 230. For example, the cursor 200e may be used to select and drag the icon 200d into the well 242 to thereby relocate the icon 200d into the well 242 of the drawer 230. In this manner, if the icon 200d represents a movie, this icon will be added to the drawer so the user may select for playback the movie represented by this icon by merely opening the drawer and then selecting this icon in well 242. This foregoing process may be reversed to thereby delete an icon from the well 230. For example, the cursor 200e may be used to select an icon, such as media source icon 248, and then to drag this icon from its well out of the drawer 230 and into the trash can 200c. This will cause the icon 248 to be removed from the drawer 230 and this icon and its associated media will no longer be a favorite which can be selected by selecting an icon within the drawer 230.

Another way to add a favorite into the drawer 230 is to open a media, such as a movie, so that it is displayed within the window 202 (or in the case of an audio file, the audio file is ready to be played). Then, the user can use the pull down menu 200h to select the option "add favorite" which adds the media to the first available well in the drawer 230.

The icons within the drawer 230 may also be used to create a short cut or alias to the media by dragging an icon from the drawer 230 to the desktop (except for the trash can).

Auxiliary Drawers/Panels

Figure 6A:
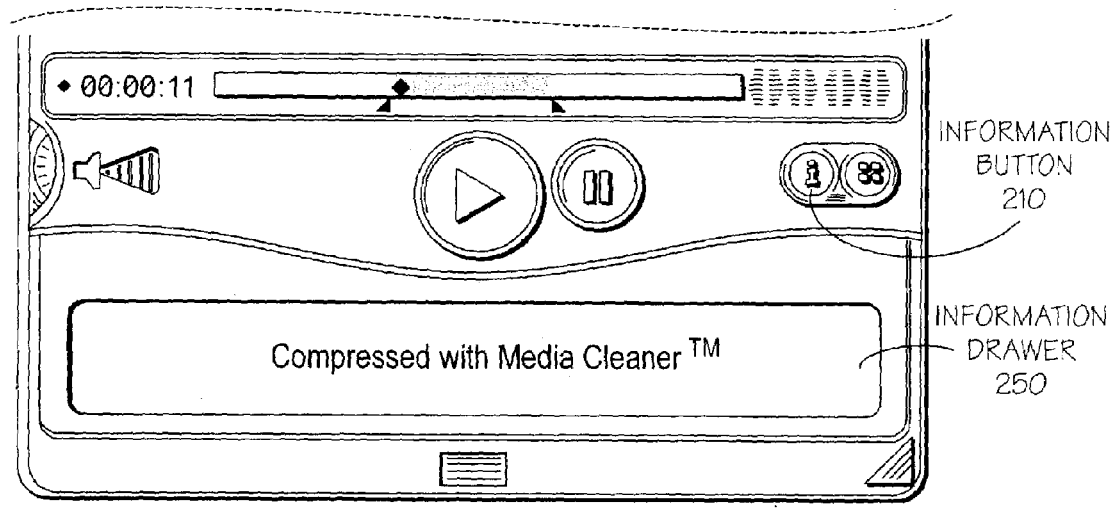
FIG. 6A is a diagram of time-based media player providing an information panel (or drawer) window generated as GUI, according to one embodiment of the invention.

FIG. 6A is a diagram of time-based media player providing an information panel (or drawer) window generated as GUI, according to one embodiment of the invention. In particular, FIG. 6A shows the bottom portion of the media player 200 shown in FIG. 3A having "opened" an information drawer 250. The information drawer 250 also represents a "drawer" or secondary window that may be revealed (or opened) or hidden relative to the media player 200 window. In one embodiment, the drawer 250 behaves relative to window 200 in the same manner as drawer 230 behaves relative to window 200. For example, the drawer 250 appears attached to and moves with the window 200 when the window 200 is moved around the desktop. The information drawer 250, in one embodiment, is primarily utilized to display any one or combination of various types of information associated with a currently selected media. Such information may include, but is not limited to, copyright/trademark information, encryption information, data compression information, other credits, warnings, etc. For example, as shown in FIG. 6A, the information drawer 250 displays the message "Compressed with Media Cleaner™."

To view the information displayed by the information drawer 250 when the media player 200 window appears as shown in FIG. 3A (i.e., with the information drawer 250 closed), the information button 210 may be selected (e.g., by placing the cursor over the button 210 and depressing and releasing a select button, such as a mouse button). In response to selection of the information button 210, the information drawer 250 will open (e.g. by appearing to slide out from under the window 200) and reveal information about the current media, for example, as shown in FIG. 6A.

Figure 6B:
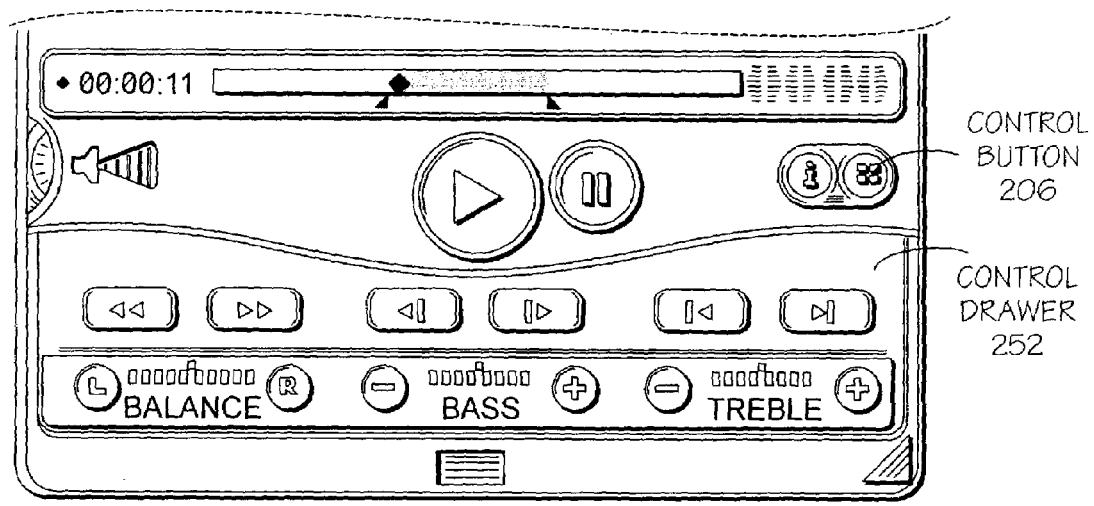
FIG. 6B is a diagram of a time-based media player providing a control panel (or drawer) window generated as a GUI, according to one embodiment of the invention.

FIG. 6B is a diagram of a time-based media player providing a control drawer window generated as a GUI, according to one embodiment of the invention. In particular, FIG. 6B shows the bottom portion of the media player 200 shown in FIG. 3 having "opened" a control drawer 252. The control drawer 252 also represents a "drawer" or secondary window that may be revealed (or opened) or hidden relative to the media player 200 window. In one embodiment, the drawer 252 behaves relative to window 200 in the same manner as drawer 230 behaves relative to window 200. For example, the drawer 252 appears attached to and moves with the window 200 when the window 200 is moved around the desktop. In one embodiment of the invention, the control drawer 252 is provided to display additional controls/functionality for play back or other processing of a time-based media by the media player 200. As shown in FIG. 6B and the control drawer 252, such information may include, but is not limited to, audio bass, treble, and balance controls, forward/backward scan, skip, etc.

To utilize or view the controls/functions provided by the control drawer 252 when the media player 200 window appears as shown in FIG. 3A (i.e., with the control drawer 252 closed), the control button 206 may be selected (e.g., by placing the cursor over the button 206 and depressing and releasing a select button, such as a mouse button). In response to selection of the control button 206, the control drawer 252 will open (e.g. by appearing to slide out from under the window 200) and reveal controls, such as those shown in FIG. 6A and described above, to control play back and/or other processing of time-based media.

Time/Chapter Selection and Display

Figure 7A:
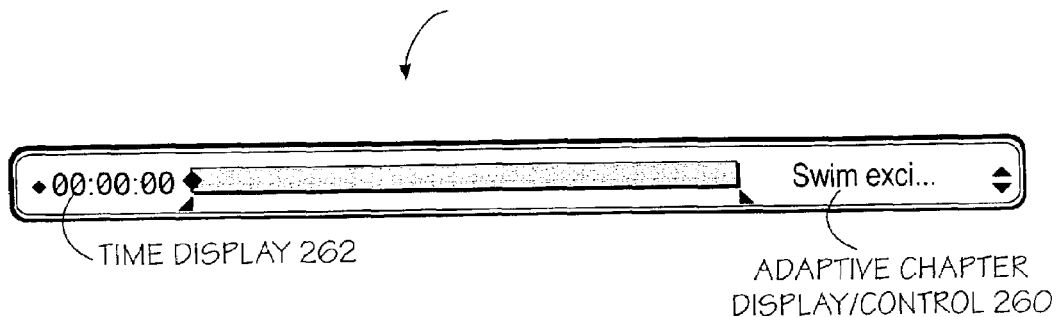
FIG. 7A illustrates a time/chapter display control of a time-based media player generated as a GUI, and in particular.
Figure 7B:
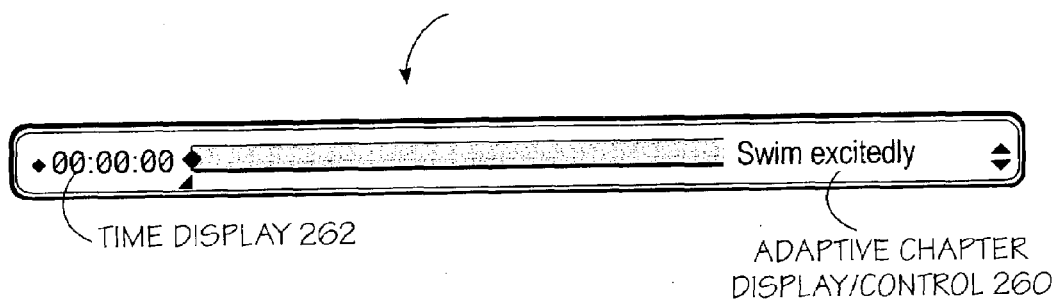
FIG. 7B illustrates a time/chapter display control of a time-based media player generated as a GUI, and in particular.

FIGS. 7A-7B illustrate a time/chapter display control of a time-based media player generated as a GUI, and in particular, illustrate an adaptive chapter display/control, according to one embodiment of the invention. In one embodiment of the invention, a time-based media file may be indexed into chapters, wherein each chapter marks the beginning (and ending) of a particular time segment in the time-based media file. Such chapters may be predefined for a media file and/or may be determined by a user. Each chapter may be entitled by its index number (e.g., "Chapter 2" for the second chapter, and so forth) and/or have a descriptive title (e.g., "Wedding scene"). Therefore, it will be appreciated that chapters are typically descriptions (e.g. text) that indicate or correspond to a time or time range in a time-based media file. Also, a sequential list of chapters may represent the entire contiguous time of a time-based media file.

In FIG. 7A, the time/chapter display/control 204 of the media player 200 is shown, which includes an adaptive chapter display/control 260 and a time display 262, which display the corresponding chapter and current time, respectively, of a time-based media file/channel. The adaptive chapter display/control 260, as shown in FIG. 7A, is in an idle or unselected state, in which the current chapter (entitled "Swim excitedly") is truncated to a predetermined idle state display size, as depicted by "Swim excit . . . "

On the other hand, when the adaptive chapter display/control 260 is in an active state, as shown in FIG. 7B, its size adapts, in one embodiment, to display the entire title of the current chapter. In one embodiment, the adaptive chapter display/control 260 becomes active in response to a user input to change or browse/scroll through chapters. The user input may include, for example, clicking and holding a pointing device (e.g., mouse, trackball, etc.) button while the cursor is over the area 260. Alternatively, the user input may include speech commands which are recognized by a digital processing system. The user may then cause the chapter displayed by the adaptive chapter display/control 260 to change by moving the cursor (via a pointing device such as a mouse, for example) up and down to display the previous or next chapter(s), respectively.

In one embodiment, the time it takes for the cursor to be moved up or down a specified distance above or below the midlevel or other predefined location of the adaptive chapter display/control 260 (e.g. the speed of the cursor movement) is used to determine the scrolling speed of the chapter(s) being displayed in the adaptive chapter/display control 260. As such, in one embodiment, the faster the cursor movement, the faster the chapters scroll up or down in the display 260, and conversely, the slower the cursor movement, the slower the chapters scroll in the area of the adaptive chapter/display control 260.

In one embodiment, as a user scrolls up or down through chapters by moving the cursor over the adaptive chapter display/control 260, the times corresponding to the chapters are also scrolled up or down in the time display 262. In one embodiment, the time may be directly changed up or down by placing the cursor on the time display 262, clicking and holding the pointing device select button, and moving the cursor up or down with the pointing device. In response, the chapter display 260 will also change to correspond to the time. Thus, the time display 262 and chapter display 260 are linked such that selecting a particular time will cause the chapter display 260 to show the corresponding chapter and visa versa. Furthermore, in one embodiment of the invention, the speed with which the cursor is moved up or down by the user (e.g., using a pointing device, such as a mouse) will determine the scroll speed of the indicators in time and/or chapter display areas 262 and 260. This will be further described below in conjunction with FIGS. 12A and 12B.

Figure 7C:
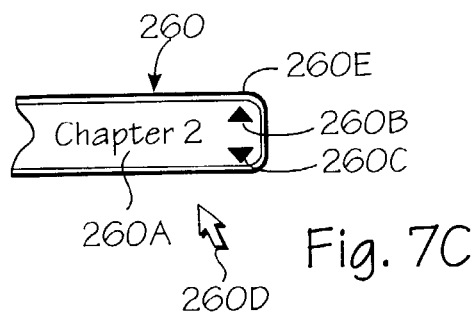
FIGS. 7C-7J show the scrolling capabilities of the chapter display area 260 according to one embodiment of the invention.

FIG. 7C shows an example of the chapter display/control area 260 which includes the chapter designator 260a and an up arrow 260b and a down arrow 260c. the cursor 260d is also shown in the vicinity of the control area 260 although it is outside, in one embodiment, of the area 260. Typically, the area 260 may be defined by the border 260e as shown in FIG. 7C. When the cursor 260d is within the border 260e, then by starting a drag within this border, the scrolling of the chapters may be initiated as described herein. This will be further described in conjunction with FIGS. 7F-7J.

Figure 7D:
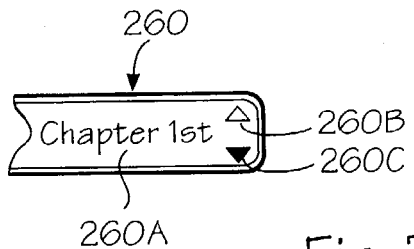
Figure 7E:
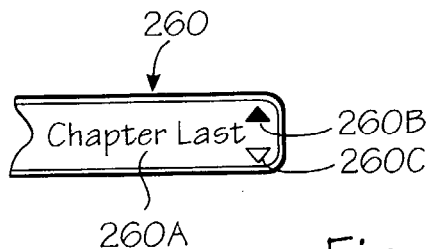

FIG. 7D illustrates the appearance of the chapter area 260 when the very first chapter or section is selected and displayed within the area 260. The chapter designator 260a indicates this is the first chapter and the up arrow 260b is not highlighted while the down arrow 260c is highlighted. This difference in highlighting indicates that a user can only go down into the media rather than also being able to go up in the media. Note that with chapter 2 selected in FIG. 2C, the user can go in either direction. As shown in FIG. 7E, when the last chapter is indicated by the chapter designator 260a in the chapter area 260, only the up arrow 260b is highlighted while the down arrow 260c is not.

Figure 7F:
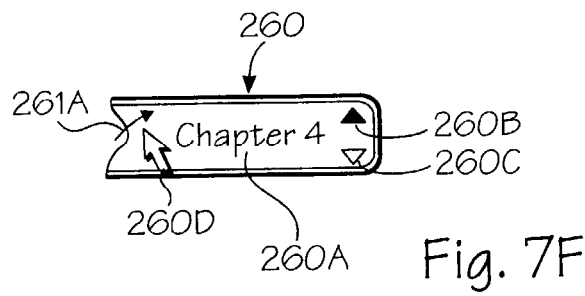
Figure 7G:
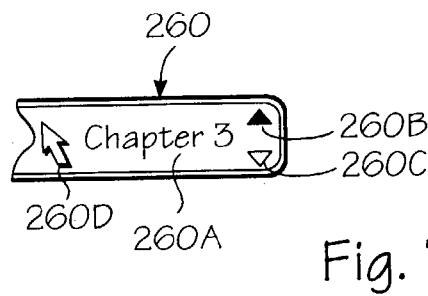
Figure 7H:
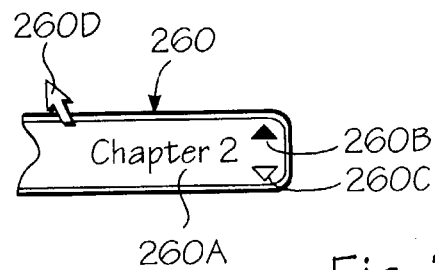
Figure 7I:
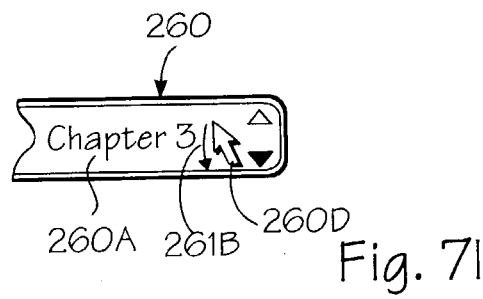
Figure 7J:
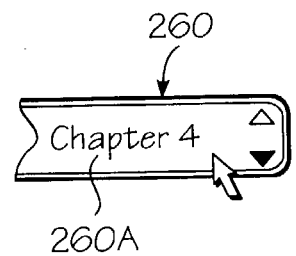

FIGS. 7F, 7G, and 7H illustrate a scrolling up operation while FIGS. 7I and 7J illustrate a scrolling down process. The scroll begins in FIG. 7F by positioning the cursor 260d within the chapter area 260 and by moving the cursor in an upwardly direction as shown by the arrow 261a. Typically, the cursor is positioned within the area and then the user indicates the dragging of the cursor by pressing a mouse button or other button and holding the button down while moving the cursor. After the beginning of the drag, the up arrow 260b becomes highlighted and the down arrow 260c is no longer highlighted, indicating the direction of the scroll, which in this case is up from chapter 4 to chapter 2 as shown in FIG. 7H. FIG. 7G shows an intermediate stage where the cursor 260d has moved from approximately a midline point within the chapter display control area 260 to a point approximately two-thirds of the way up, resulting in chapter 3 being displayed as the chapter designator 260a while the up arrow continues to be highlighted during the scroll operation which ends in FIG. 7H as the cursor 260d is now positioned above the area 260. The scroll can continue as long as the mouse button or other button remains depressed, indicating an active drag of the cursor which began in the chapter display area 260.

FIGS. 7I and 7J illustrate scrolling in the opposite direction by positioning the cursor 260d within the area 260 and then dragging it down as shown by the arrow 261b. As the cursor 260d is dragged downwardly, the chapter designator changes from chapter 3 to chapter 4 as shown in FIG. 7J, and the cursor 260d is now closer to the lower portion of the area 260 as shown in FIG. 7J.

Figure 8A:
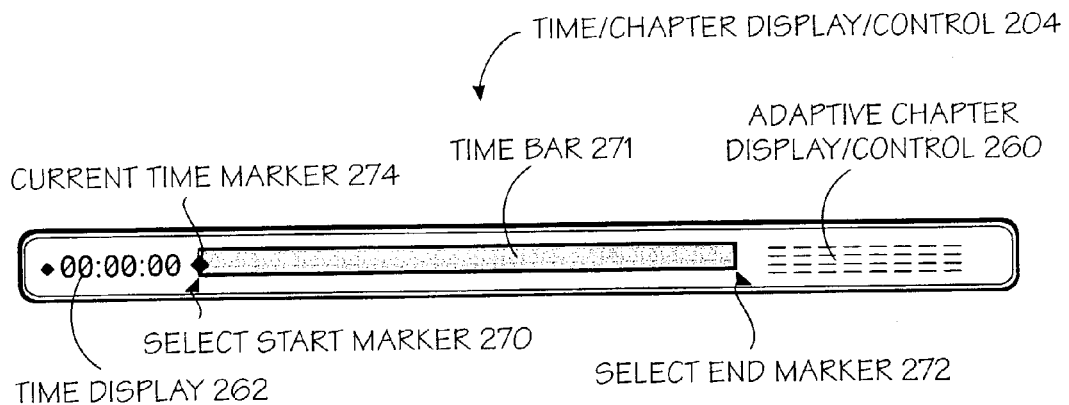
FIG. 8A illustrates a GUI mechanism of a time-based media player for selecting a range of time within a time-based media file, according to one embodiment of the invention.
Figure 8B:
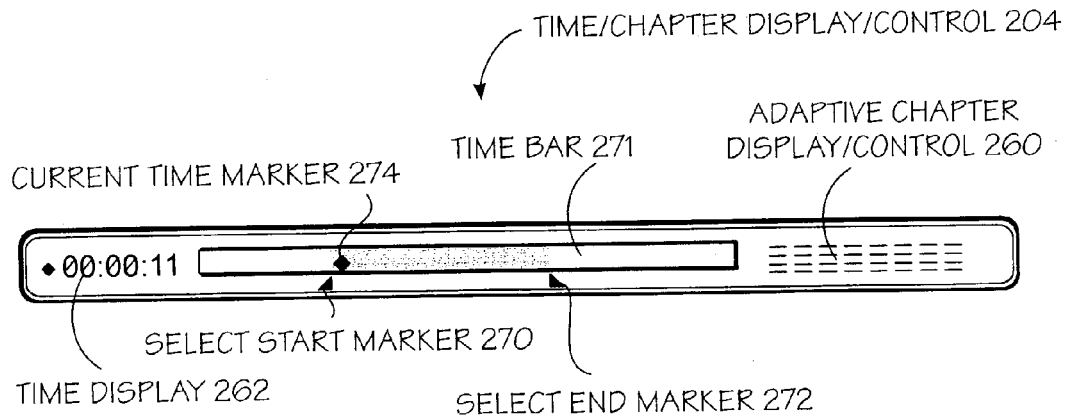
FIG. 8B illustrates a GUI mechanism of a time-based media player for selecting a range of time within a time-based media file, according to one embodiment of the invention.

FIGS. 8A-8B illustrate a GUI mechanism of a time-based media player for selecting for playback (or other presentations) a range of time within a time-based media file, according to one embodiment of the invention. As shown in FIGS. 8A and 8B, in addition to the time display 262 and the adaptive chapter display/control 260, the time/chapter display/control 204 includes a time bar 271. The time bar 271 represents a time line of the current time-based media file. The position of a current time marker 274 on the time bar 271 indicates the current time (e.g., time currently being played back, such as an approximation of the time of the currently displayed frame in window 202) of the currently selected media file. A user may drag the position of the current time marker 274 along the time bar 271 to change the time-based media file's current time to a currently selected time. In one embodiment, the time display 262 and the adaptive chapter display/control 260 are updated (to show the current time and current chapter, respectively) as the current time marker 274 is moved and a frame at the currently selected time is also displayed in window 202 to update that window. In one embodiment, when a time-based media file is being played back, the current time marker 274 moves from the left to the right to indicate how much of the time-based media file (depicted by the entire length of the time bar 271) has elapsed or remains.

In addition, a select start marker 270 and a select end marker 272 allow selection of a time range within a time-based media file. This time range, once selected, allows playback (or other presentation) of only a portion of the time-based media file. In FIG. 8A, the select start marker 270 is positioned at the left-most end of the time bar 271, which coincides with time zero and the beginning of the current time-based media file. Also in FIG. 8A, the select end marker 272 is positioned at the right-most end of the time bar 271, which corresponds to the end of the time-based media file. Thus, if the time-based media file is played back with the markers positioned as shown in FIG. 8A, the entire time-based media file will be played back in window 202 from beginning to end, unless stopped.

On the other hand, as shown in FIG. 8B, the select start marker 270 is moved to the right relative to its position shown in FIG. 8A. Similarly, the select end marker 272 is shown moved to the left relative to its position shown in FIG. 8A. As such, only the time range corresponding to that portion of the time bar between the select start marker 270 and the select end marker 272 shown in FIG. 8B is selected in FIG. 8B. Therefore, a user may select substantially any start or end time to determine a particular range of time for playback in a time-based media file. The selected range may be played back, used for editing (e.g., it may be cut from, added to, etc., to a time-based media file), used for creating a new time-based media file with the selected range and placing a corresponding icon in the favorite/channel drawer, or other purposes.

In one embodiment, when a user changes or scrolls through the time or chapters of a time-based media file using any of the three mechanisms described with reference to the time/chapter display/control 204, the display window 202 of the media player 200 also displays the image frame at the corresponding time/chapter "dragged" by the user.

Figure 8C:
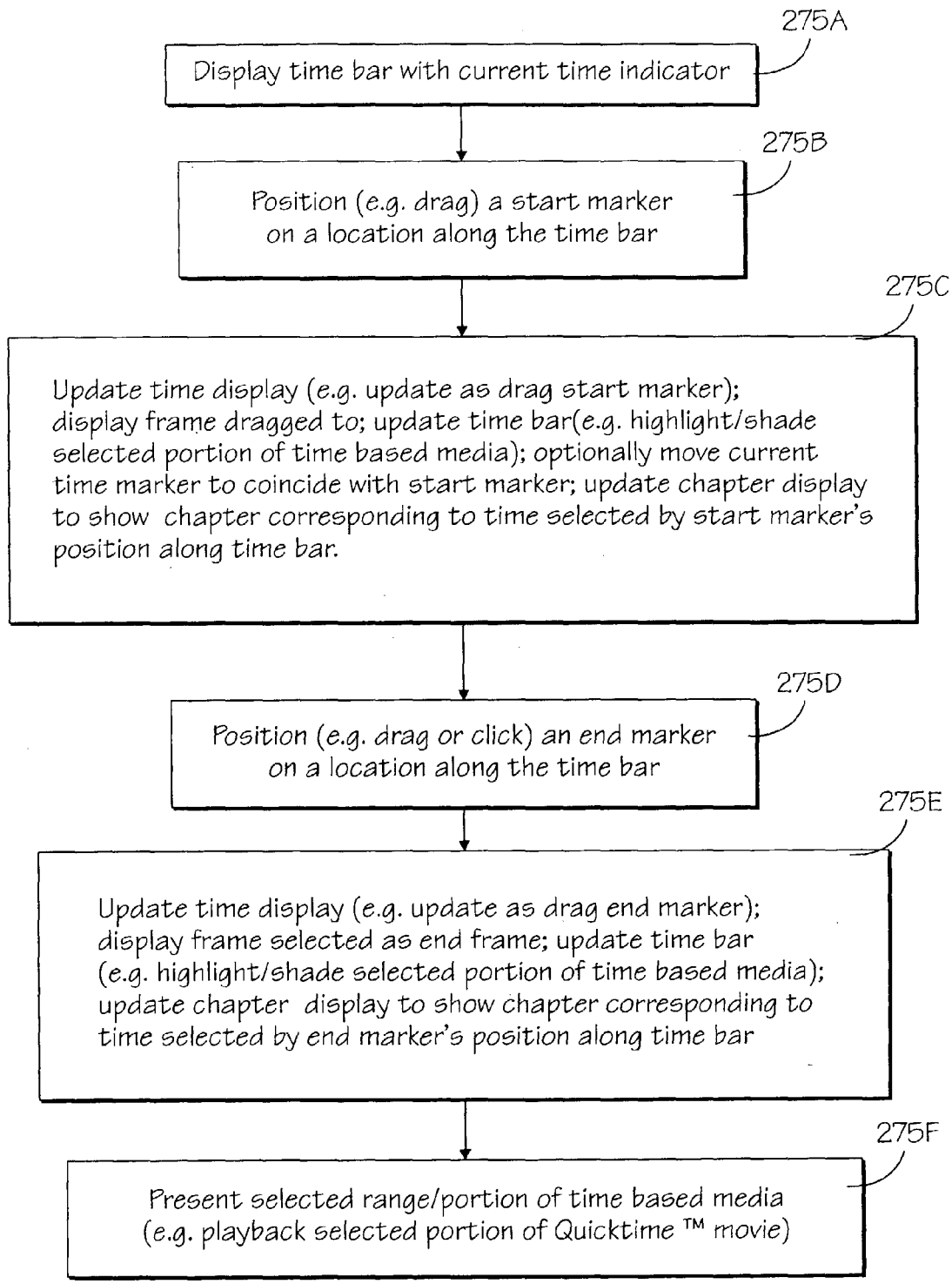
FIG. 8C illustrates a flowchart which shows a method for selecting a range of time for playback of a time-based media file.

FIG. 8C shows a flowchart which represents one particular method for implementing the interface shown in FIGS. 8A and 8B. In operation 275a a time bar, such as time bar 271, is displayed with a current time indicator, such as the time display 262. In operation 275b, a start marker, such as the select start marker 270 is positioned on a location along the time bar 271. This may be achieved by positioning a cursor over the select start marker 270 and by dragging the select start marker 270 along the time bar 271. The operation of dragging an icon is well known in the art and may be achieved by positioning a cursor in association with the icon, selecting the icon by depressing a mouse button, and while keeping the mouse button depressed, moving the cursor and thereby also moving the icon in a drag operation. In operation 275c, a number of different operations may occur concurrently with the drag operation in 275b or at the end of a drag operation. In the preferred embodiment, these operations may be performed during the drag operation rather than at the end. In this manner, feedback is given to the user as to the particular start frame which has been selected as the start select marker 270 is moved along the time bar 271. Some or all of the operations in operation 275c may be performed as these drag operations occur. The time display, such as time display 262, may be updated (e.g. updated from 00:00:00 to 00:05:05) as the start marker is dragged along the time bar. The time display will be updated to indicate the start time selected at the current location of the start marker 270 along the time bar 271. Also, the display frame which has been selected as the start frame may be displayed within the window 202. Further, the time bar itself may be updated to indicate the selected portion of the time-based media. This is shown in FIGS. 8A and 8B by the highlighting which occurs in the middle of the time bar 271 while the ends of the time bar are not highlighted. Dragging the start selector 270 from left to right will change the amount of highlighting along the time bar, thereby indicating the amount of the movie which has been selected for playback. Also, the current time marker may optionally be moved to coincide with the start time marker. Further, the chapter display may be updated to show the chapter corresponding to the time selected by the start marker's position along the time bar. Of course, if a particular time-based media file has no chapters, there is no need to update the chapter display in the control area 260.

The user may perform a positioning operation on the select end marker 272 as indicated in operation 275d of FIG. 8C. In particular, the user may drag the end marker to a location along the time bar 271 or may position the cursor without a drag operation over a particular location and then click to indicate that location after having previously selected the end marker for a positioning operation. The same type of positioning operation may be performed with the start marker 270. As the end marker is dragged along the time bar 271, the time display 262 indicating the end of the movie may be updated and a display area 202 may also show the currently selected end frame in order to let the user know when the selected portion of the movie will end. Also, the time bar may be highlighted or shaded to indicate the end of the selected portion as shown in FIG. 8B and this highlighting or shading may be updated as the select end marker is dragged along the time bar 271. Further, the chapter display may be updated during the drag operation or positioning operation of the end marker to show the chapter corresponding to the time selected by the end marker's position along the time bar.

After positioning one or both of the start and/or end markers, the user may cause the presentation of the selected range/portion of the time-based media by, for example, "clicking" on the play button 216.

Figure 8D:
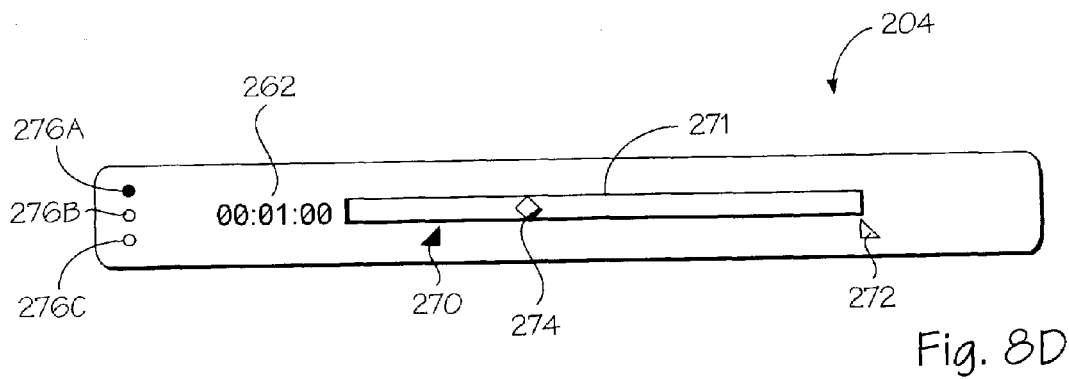
FIGS. 8D-8F show an example of a timecode mode selector interface which may be used with the current time, start and end markers.
Figure 8E:
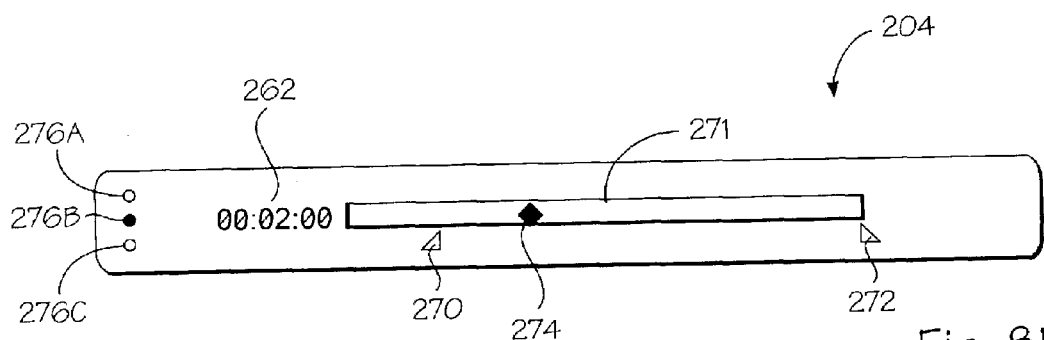
Figure 8F:
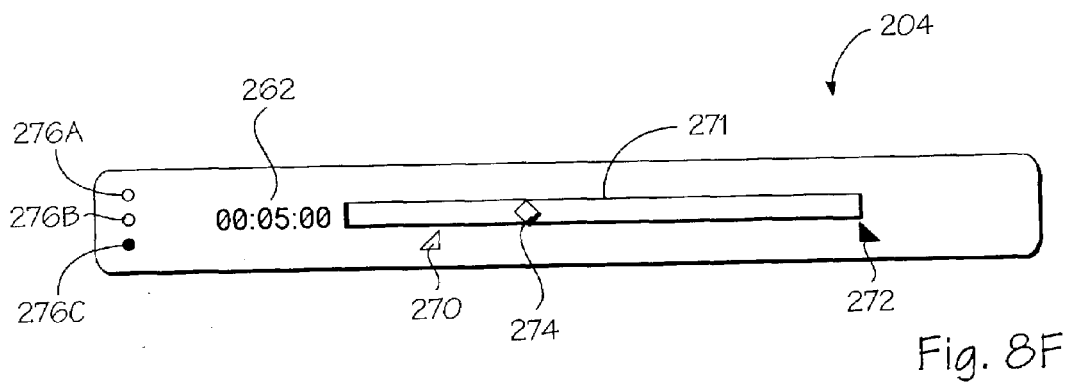

FIGS. 8D, 8E, and 8F illustrate the display, in one embodiment, of a time display/control area 204. This area 204 includes a time bar 271 as well as a current time marker 274 and select start marker 270 and select end marker 272. The display and control area 204 also includes time display 262. As with the embodiment shown in FIGS. 8A and 8B, the current time marker shows the current time for the current frame relative to the time bar 271. The select start marker 270 shows the selected start time and the select end marker 272 shows the selected end time. The markers 270, 272, and 274 may be dragged along the time bar 271 as with the embodiment shown in FIGS. 8A and 8B in order to modify the current time or the start time or the end time as described above. Three buttons on the left portion of the control and display area 204 relate and correspond to the three markers 270, 272, and 274. In particular, the button 276a corresponds to the select start marker 270, and the marker 276b corresponds to the current time marker 274, and the select end marker 272 corresponds to the button 276c. Each of these three buttons 276a, 276b, and 276c may be selected (e.g. by positioning a cursor over the button and depressing and releasing a mouse button or another key on the system), and when the particular button is depressed, the time of the corresponding marker is shown in the display time area 262 and the corresponding marker is also highlighted with its corresponding button. For example, as shown in FIG. 8D, the selection of the button 276a causes the start marker 270 to be highlighted and causes the time display 262 to show the time of the select start marker 270. Similarly, FIG. 8E shows that when the button 276b is selected, it becomes highlighted and the current time marker 274 becomes highlighted and the time of the current time marker is displayed within the time display 262. Similarly, FIG. 8F shows that when the button 276c is selected, it becomes highlighted and the select end marker 272 becomes highlighted and the ending time selected by the marker 272 is shown in the time display 262.

These buttons 276a, 276b, and 276c also provide feedback to a user, indicating which of the three markers is being selected and manipulated by the user. For example, when the select start marker 270 is selected and is being dragged along the time bar 271, the button 276a becomes highlighted while the buttons 276b and 276c are not highlighted. This indicates to the user that the start marker is being manipulated and the time display 262 is updated to follow the movement of the marker 270 to show the currently selected start time. Similarly, when the current time marker 274 is selected for direct manipulation (e.g. a dragging of the marker 274) then the button 276b is highlighted while the other buttons 276a and 276c are not highlighted. Similarly, when the marker 272 is being dragged along the time bar 271, the button 276c is highlighted while buttons 276a and 276b are not highlighted as shown in FIG. 8F.

Streaming Status Message Display

Figure 9A:
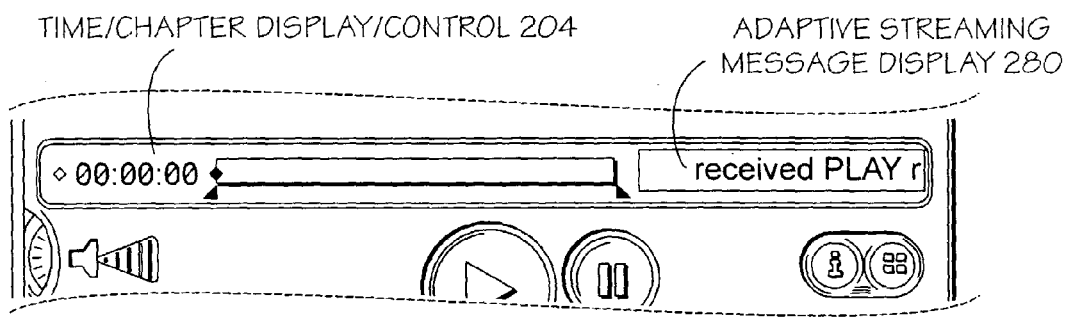
FIG. 9A illustrates an adaptive streaming status message display of a time-based media player generated as a GUI, according to one embodiment of the invention.
Figure 9B:
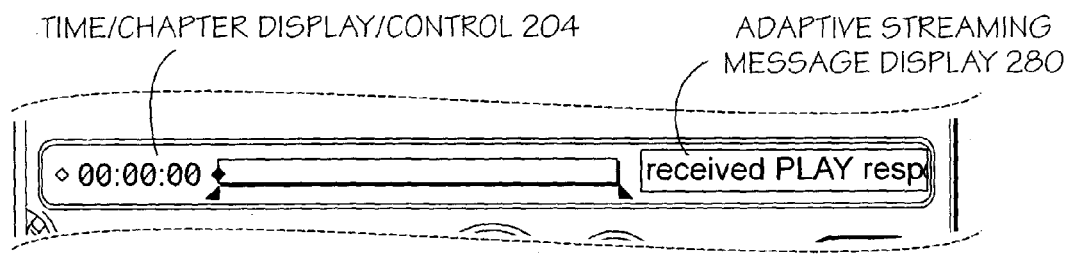
FIG. 9B illustrates an adaptive streaming status message display of a time-based media player generated as a GUI, according to one embodiment of the invention.

FIGS. 9A-9B illustrate an adaptive streaming status message display of a time-based media player generated as a GUI, according to one embodiment of the invention. This status message display may also be used for non-streaming media.

In one embodiment, the media player 200 may play back or otherwise process time-based media received over a network. For example, a QuickTime movie may be streamed by a remote digital processing system, typically a server, to the user's local system, where the user has requested the movie (e.g., by clicking on an icon in the favorite/channel drawer of the media player being executed on the local system, wherein the icon references the movie and/or the server that provides the movie).

As shown in FIGS. 9A and 9B, the time/chapter display/control 204 provides a mechanism for displaying status information related to streaming of time-based media over a network. In particular, as shown in FIGS. 9A and 9B, an adaptive streaming message display 280 appears in the time/chapter display/control 204. The adaptive streaming message display 280 scrolls in from the right-most portion of the time/chapter display/control 204 to display status messages such as "Connecting . . . ", "Negotiating . . . ", "Receiving . . . ", "Buffering . . . ", and/or other status messages. The status messages in the message display 280 scroll from the right and cover as much of the time/chapter display/control 204 as needed to display the message.

In one embodiment, when a currently displayed status message is to change to the next status message (e.g., from "Connecting" to "Negotiating"), the current message will scroll "out" to the right. For example, FIG. 9A shows a portion of the message "received PLAY response . . . " scrolling in from the right to the left in the adaptive streaming message display 280, while FIG. 9B shows a larger portion of the same message having been scrolled in from the right to the left. However, if another status message were to follow, the message "received PLAY response . . . " would scroll out from the left the right (i.e., in the opposite direction). Thus, in one embodiment of the invention, each status message appears and disappears in a streaming/scrolling fashion.

Figure 9C:
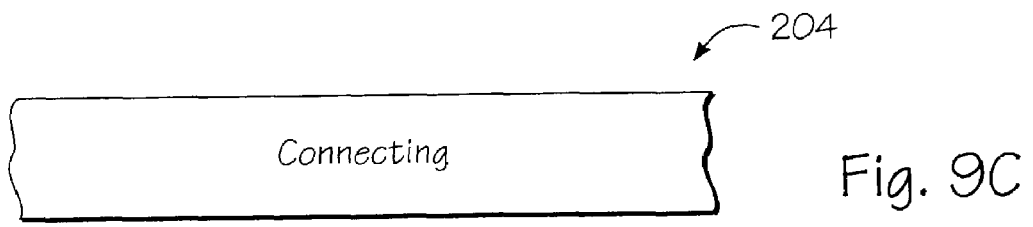
FIGS. 9C-9H show another example of a status message display for a media player according to the present invention.
Figure 9D:
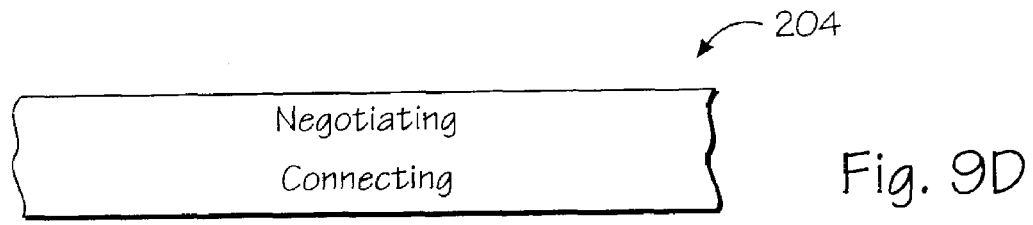
Figure 9E:
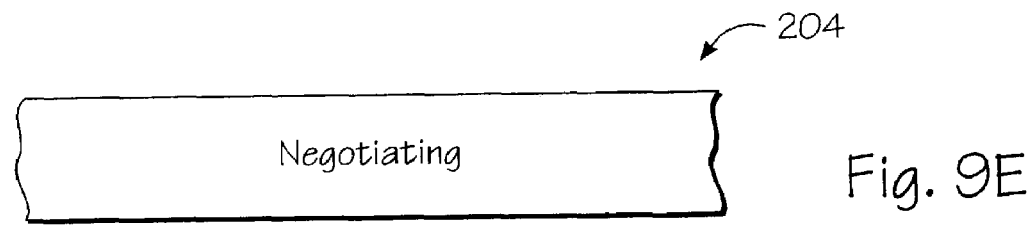
Figure 9F:
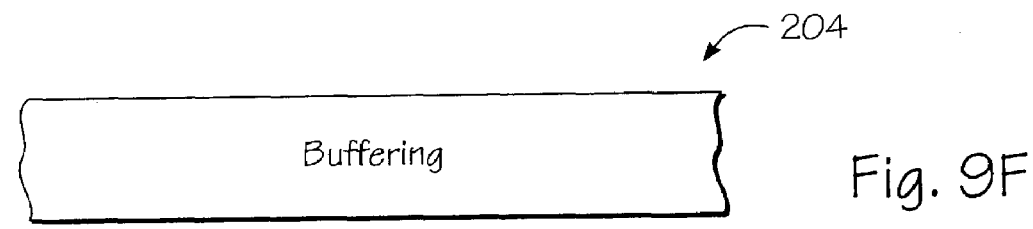
Figure 9G:
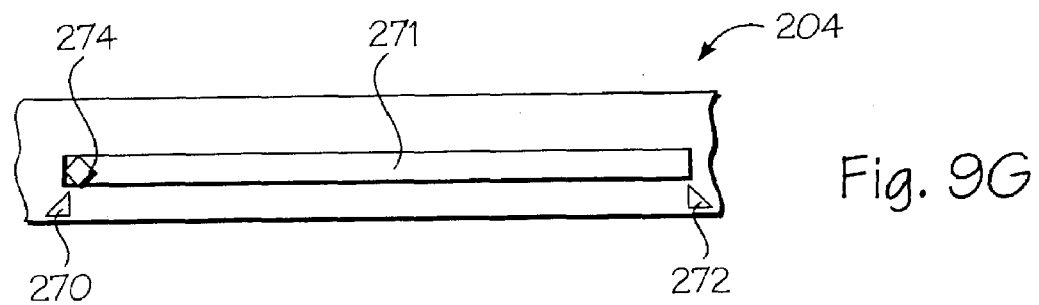
Figure 9H:
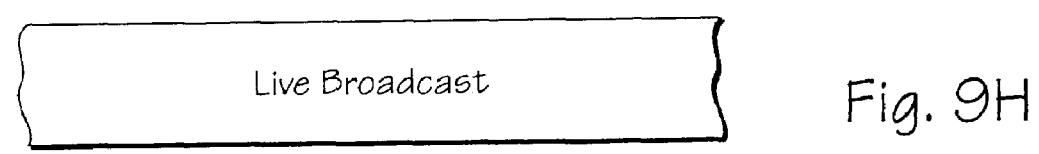

FIGS. 9C-9H illustrate an alternative embodiment for a status message display for a media player according to one embodiment of the invention. Each of these figures shows a portion of the display control area 204. This portion shown may be the middle of the area, for example, the middle of the area shown in FIG. 7A. In this instance, the time bar may not be displayed while these messages scroll through this area. FIG. 9C shows the beginning of a sequence of messages which may occur when the media player is receiving a streaming media. It will be appreciated that this embodiment of the present invention may be utilized with live or stored streaming and may be used with non-streaming media; the content of the messages would, of course, be tailored to provide the appropriate information depending on the type of media and the type of connection and whether it is streaming or non-streaming media. As shown in FIG. 9C, the first message is "Connecting" and this message begins to scroll down in the area shown in FIG. 9C and the next message scrolls in from the top as the previous message "Connecting" is scrolling down. FIG. 9D shows a particular stage in which the first message "Connecting" has scrolled down to near the bottom while the second message "Negotiating" has scrolled into the area and is scrolling down. FIG. 9E shows the second message "Negotiating" has scrolled further down and the first message "Connecting" has scrolled out of view. This scrolling in a vertical direction from top to bottom continues as the third message "Buffering" scrolls into view as shown in FIG. 9F. The next message may be either that shown in FIG. 9H ("Live Broadcast" in the case of a streaming live media) or the time bar 271 with its associated markers as shown in FIG. 9G in the case of a stored streaming media or other media.

Thus the interface provided by the embodiment shown in FIGS. 9C-9H provides a vertical scrolling of messages through the area 204 by removing the time bar for a portion of the time.

Media Player and Display Window Resizing

Figure 10A:
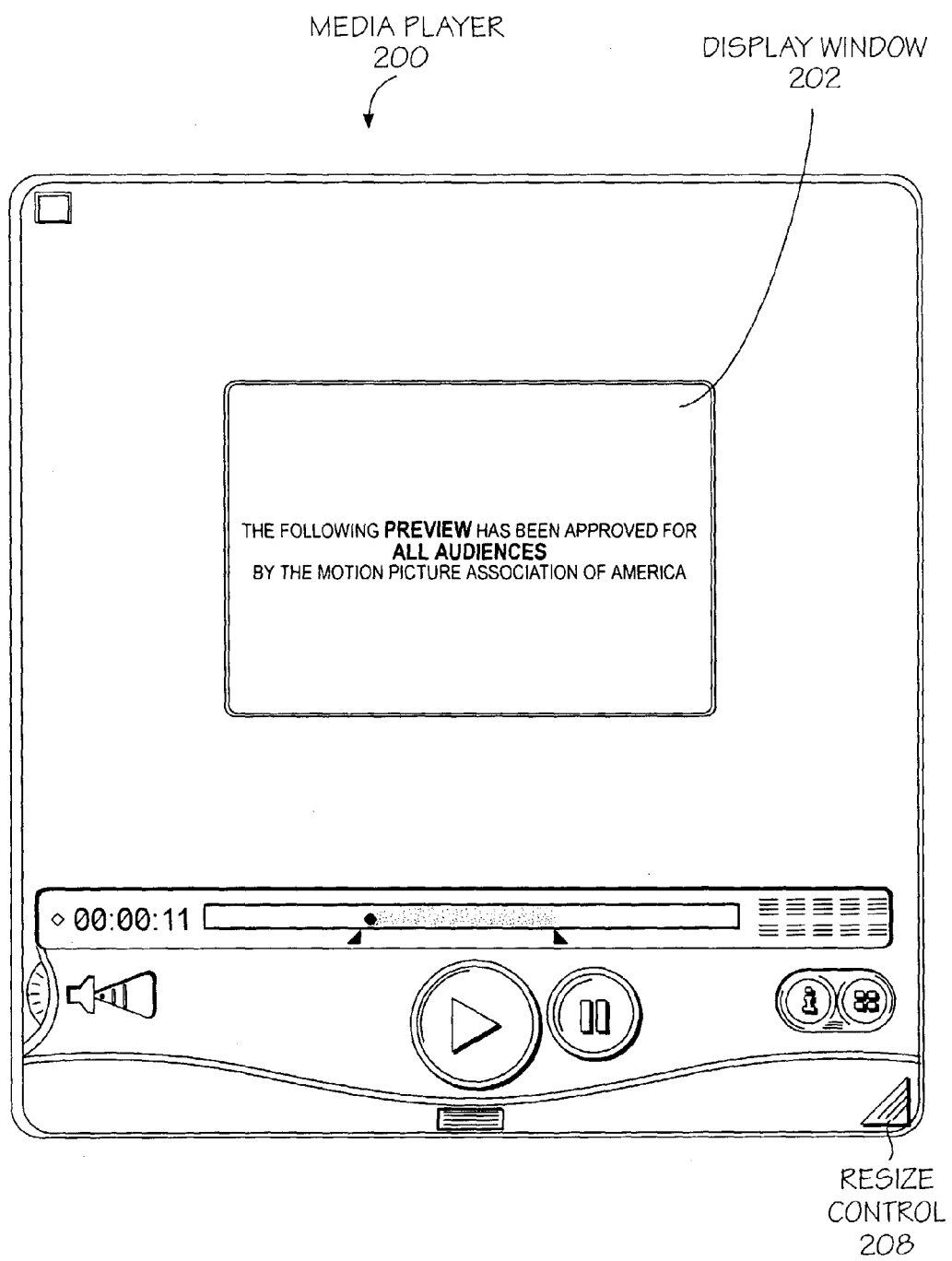
Figure 10B:
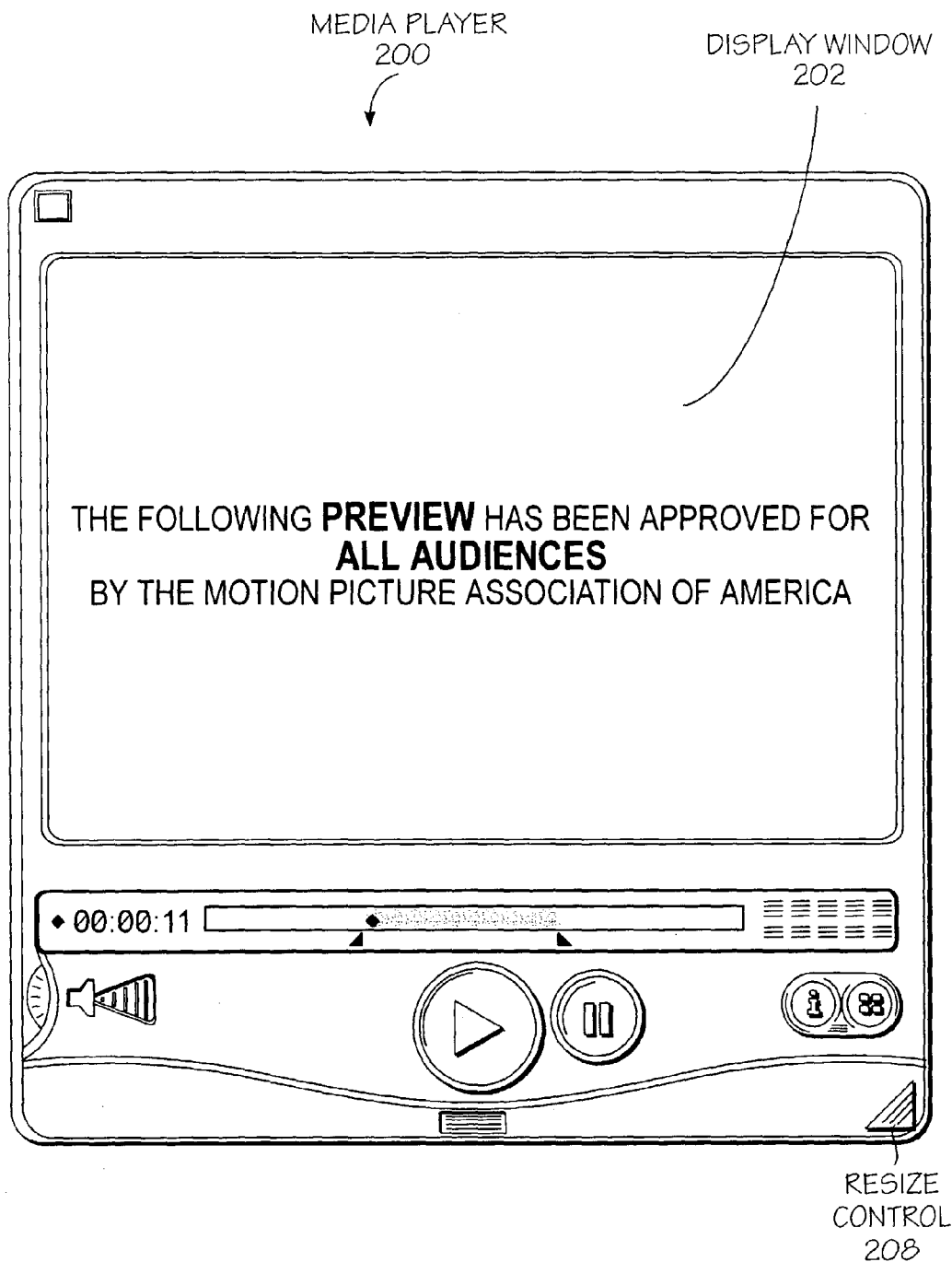

FIGS. 10A-10C illustrate resizing a time-based media player generated as a GUI and/or a display window for displaying time-based images, according to one embodiment of the invention. In one embodiment, the size of the media player 200 again depicted in FIGS. 10A-10C and/or the motion video display window 202 may be varied by dragging the resize control 208 (e.g., by depressing and holding a mouse button or other pointing select button on the resize control 208, and then moving the cursor using the mouse).

In one embodiment, the media player 200 is displayed at a default minimum window size, which is shown in FIGS. 10A and 10B while the window 202 within the player 200 may have different sizes as shown in FIGS. 10A and 10B. The video display window 202 may also have a minimum size, which in one embodiment is equal to 320×240. It will be appreciated that alternative embodiments may incorporate various other minimum or default sizes or may not incorporate a minimum size.

In one embodiment, when the resize control 208 is dragged, two animated rectangles are displayed: one animated rectangle represents the size of the display window 202 (any image displayed therein) and the other animated rectangle represents the size of the media player 200 window (which contains the window 202). The resize control 208 may be "dragged" by the cursor to resize the motion video display window 202 (and any image displayed thereby) without resizing the window 200 until the size of window 202 increases to a threshold size, which in one embodiment, corresponds to substantially the edges of the media player 200, which is shown in FIG. 10B. When this occurs, an attempt to further enlarge the motion video display window 202 will enlarge the media player 200 window as well, which is shown in FIG. 10C. However, if the user attempts to shrink the media player 200 window below the default minimum size, only the display window 202 (and its animated rectangle) will shrink, and the size of the media player 200 window will remain unchanged from the minimum size.

Figure 10D:
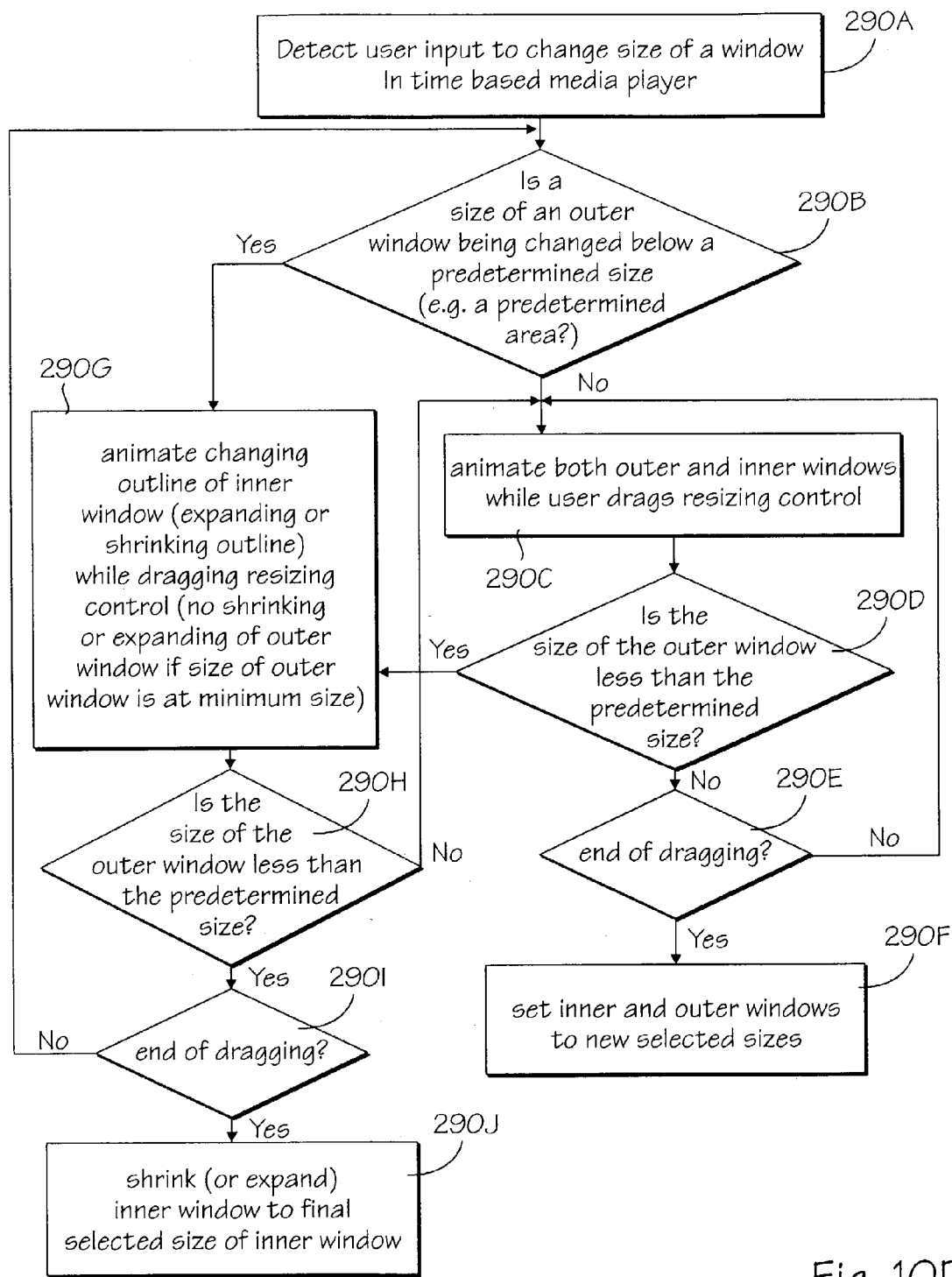
FIG. 10D is a flowchart which shows one method for controlling the display of a time-based media player during a resizing operation.
Figure 10E:
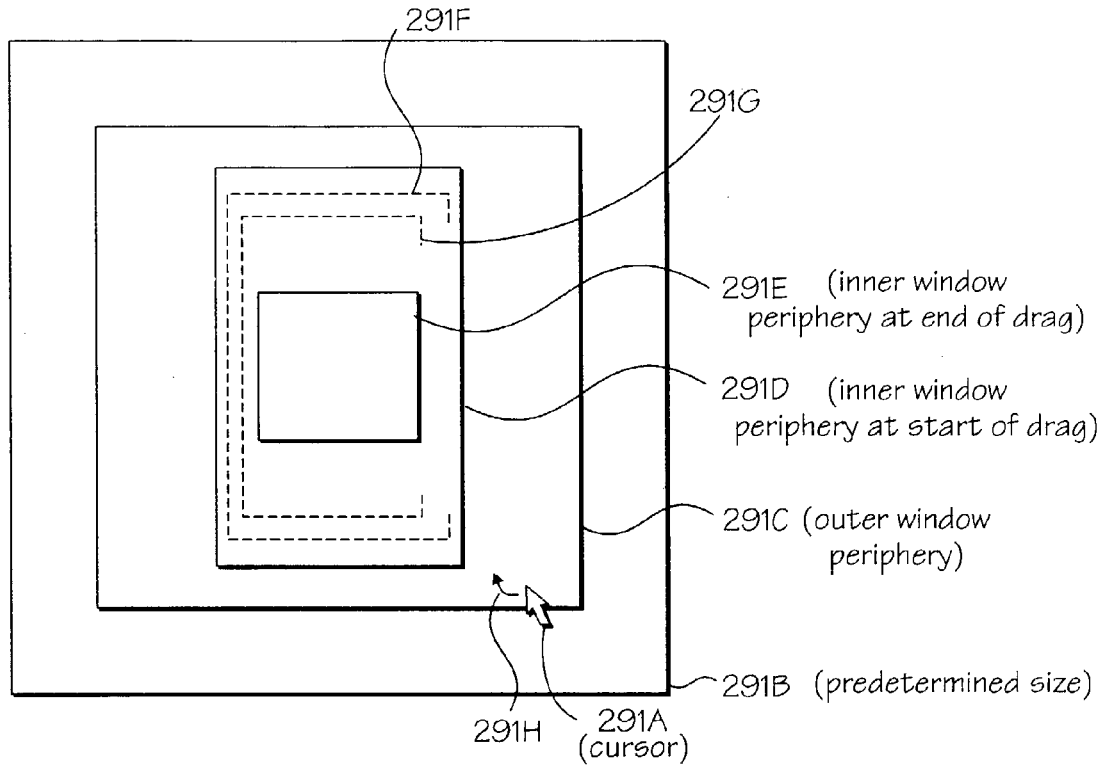
FIGS. 10E and 10F show examples of resizing operations.
Figure 10F:
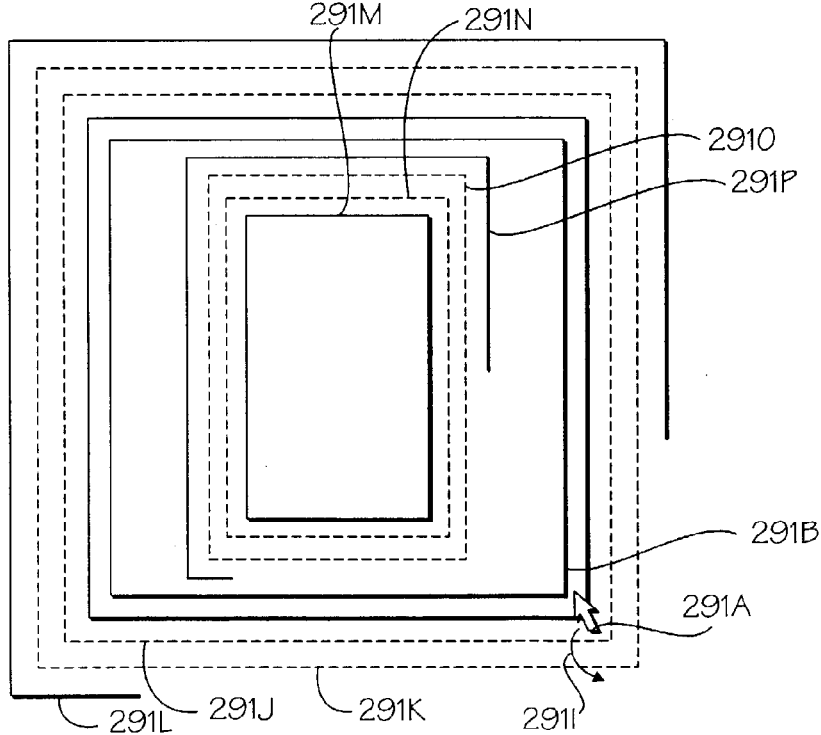

FIG. 10D is a flowchart which illustrates one method of performing a resizing operation with the two windows included in media player 200. FIGS. 10E and 10F illustrate examples of these two windows during a shrinking operation (FIG. 10E) or an enlarging operation (FIG. 10F).

Operation 290a of FIG. 10D detects a user input to change the size of a window in the time-based media player 200. Typically, this will involve a user positioning the cursor over the resize control 208 and while selecting that control, moving the cursor while the control remains selected. As long as the control is selected (e.g. keeping the mouse's button depressed down) the user is indicating to the system that the window is to be resized. The system will monitor the user's position of the cursor and control the size of the window in a corresponding manner. Typically, two animated windows are displayed, one corresponding to the currently selected size of the inner window and the other corresponding to the currently selected size of the outer window. The animated windows are animated because they change in size as the resizing operation occurs. In the case of the preferred embodiment, the outer window does not change size unless it is currently selected at a size larger than the predetermined size. This is shown in FIG. 10E in which the rectangle 291b represents the predetermined size of the outer window, which in this case is the outer perimeter of the player 200 shown in FIG. 3A. The rectangle 291e represents the inner window's periphery at the end of a drag of the cursor 291a while the rectangle 291d represents the inner window's periphery at the start of the drag. The arrow 291h represents the direction of the drag starting from one location and inwardly towards the rectangle 291e. The rectangle 291c is shown within the rectangle 291b only for purposes of illustration to separately show the two rectangles. It will be appreciated that the rectangle 291c represents the outer window's periphery and that this periphery does not shrink below the predetermined size represented by the rectangle 291b. The animated rectangles 291f and 291g appear during the process of dragging from the beginning position of the cursor to the ending position of the cursor as the inner window is reduced in size. It will be appreciated that there are a number of ways to animate the changing size of a window. In one embodiment, a zooming series of shrinking rectangles may be displayed as the user moves the cursor from one location near the outer window's periphery towards the inner window's periphery. These zooming animated rectangles are well known in the art.

FIG. 10F represents an expansion of both the inner and outer windows as the user drags the cursor 291a along the path 291i. In this case, the outer window is dragged beyond the predetermined size shown by rectangle 291b to its final size shown by rectangle 291L. Similarly, the drag operation enlarges the inner window from its beginning size shown by rectangle 291m to its final size shown by rectangle 291p. During the dragging operation, several animated rectangles may be displayed for both the inner and outer windows showing the user the size of both windows. This feedback allows the user to be able to determine the size of the outer window and also to determine the size of the inner window while a dragging operation is occurring. Thus, for example, the user can enlarge the inner window to see a bigger picture while at the same time assuring that the outer window is not enlarged too much such that it may obscure background features on a desktop or that it may extend beyond displayable area such that controls on the outer window may not be available.

Referring back to FIG. 10D, the operation, once user input is detected, proceeds to operation 290b in which the size of the outer window being changed is compared to a predetermined size such as a predetermined area. If this outer window is being changed below a predetermined size, then processing proceeds to operation 290g. This is shown in FIG. 10E in which there is a changing outline of the inner window which is animated to indicate the changing size of the inner window but the dragging operation does not affect the size of the outer window as long as the size of the outer window's size remains below the predetermined size. In operation 290h, it is determined while dragging whether the size of the outer window is less than the predetermined size. If it is not, processing proceeds to step 290i in which it is determined whether dragging has been completed. If, in operation 290, it has been determined that the size of the outer window is larger than the predetermined size, then processing proceeds to operation 290c. If, in operation 290i, it has been determined that dragging has ended, then processing returns back to operation 290b, otherwise, if dragging has ended in operation 290j, the size of the inner window is changed to the final selected size of the inner window. Typically, this will mean that the periphery of the inner window will be the same size as the periphery of the animated window which was displayed when the drag was ended.

Operation 290c is illustrated in FIG. 10F in which both the inner and outer windows have animated zooming rectangles associated with the windows while the user drags the resizing control. Animated rectangles 291n and 291o are examples of zooming animated rectangles for the inner window, and animated zooming rectangles 291j and 291k are examples of animated windows for the outer window. In operation 290d, it is determined whether the size of the outer window is less than the predetermined size. If it is not, processing proceeds to step 290e. If, in fact, the size of the outer window is less than the predetermined size, then processing proceeds to operation 290g. In operation 290e, if the drag has ended, then processing proceeds to operation 290f in which the inner and outer windows are set to the new selected sizes. If the drag has not ended as determined in operation 290e, then processing returns back to operation 290c.

In this manner, the size of both the inner and outer window may be determined by looking at the current size of the animating rectangles.

In alternative embodiments, two separate resize mechanisms may be provided, each to control resizing of one of the media player 200 and the display window 202.

Method for Providing a Favorite/Channel Drawer Window

Figure 11:
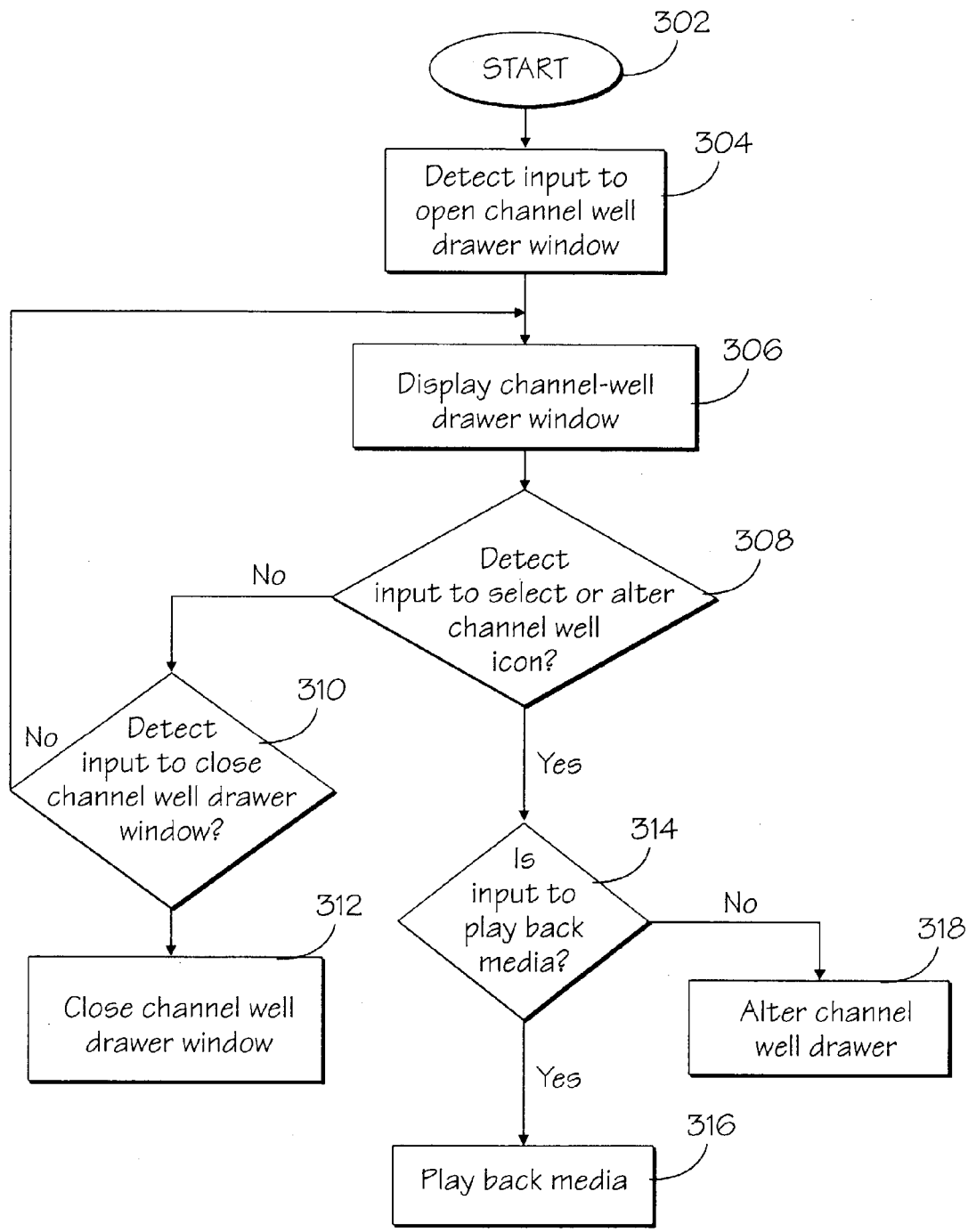
FIG. 11 is a flow diagram illustrating a method for providing a favorite/channel drawer window for a time-based media player generated as a GUI, according to one embodiment of the invention.

FIG. 11 is a flow diagram illustrating a method for providing a favorite/channel drawer window for a time-based media player generated as a GUI, according to one embodiment of the invention. Flow begins at block 302.

At block 304, input is detected to open a favorite/channel drawer window relative to a media player window. For example, such input may include dragging a drawer control icon, such as the favorite/channel drawer control 214 of FIG. 3A, in the same direction in which the favorite/channel drawer is to be opened, and doing so until a desired portion of the favorite/channel drawer is displayed. As such, in one embodiment, the size of the drawer window (and how many wells are displayed) is incrementally selectable to the extent that a user drags open or closed the favorite/channel drawer. On the other hand, in an alternative embodiment, the drawer window may be opened (e.g. displayed) at only a predetermined size, such that a user may open the drawer to such size by selecting an icon (e.g. "clicking" or double-clicking on the icon by positioning a cursor on the icon and depressing a button or by speaking the icon's name in a system with speech recognition capabilities) and may close the drawer window by "clicking" or double-clicking on the same icon. Alternatively, keyboard commands (e.g. "command]") may be used to open and close the drawer window or the selection of a command from a pull down menu may open or close the drawer window.

At block 306, the drawer window is displayed. As mentioned above, the extent to which the drawer window is displayed may be selectable, for example, as determined by the extent the drawer window is "dragged open" by a user, or may be displayed at a default/non-selectable size or proportion.

At block 308, if input is detected to select an icon in the drawer or to alter the drawer (e.g., to add, delete, rearrange, etc., an icon), flow passes to block 314. Otherwise, flow passes to block 310. The input may include clicking on an icon in a well of the drawer, dragging an icon to or from a well, etc.

At block 310, if input is detected to close the drawer (e.g., a user dragging the drawer control 214 up to hide to the drawer or a portion thereof), flow passes to block 312 where the drawer window is (at least partially) closed. Otherwise flow passes back to block 306.

At block 314, if the input detected at block 308 is directed to playback of time-based media data (e.g., the user clicks an icon in the drawer), flow passes to block 316, where the time-based media file is played back by the time-based media player. For example, the user may click on a time-based media icon in the drawer that references a time-based media file, such as a QuickTime movie, that is stored locally or at a remote server. The movie would then be retrieved and played back from local storage or streamed to the user's local system where the media player would display the movie (e.g., in the display window 202) and/or playback audio tracks of the movie.

Otherwise, flow passes to block 318, where the drawer window is altered. Such alteration may include dragging an icon or file name from another location in the user's computer system (e.g., the desktop or other directory/location) to a well of the drawer or visa versa; dragging a time-based media icon from one well location to another well location; deleting a time-based media icon from the drawer; etc.

Adaptive Chapter/Time Selection

Figure 12A:
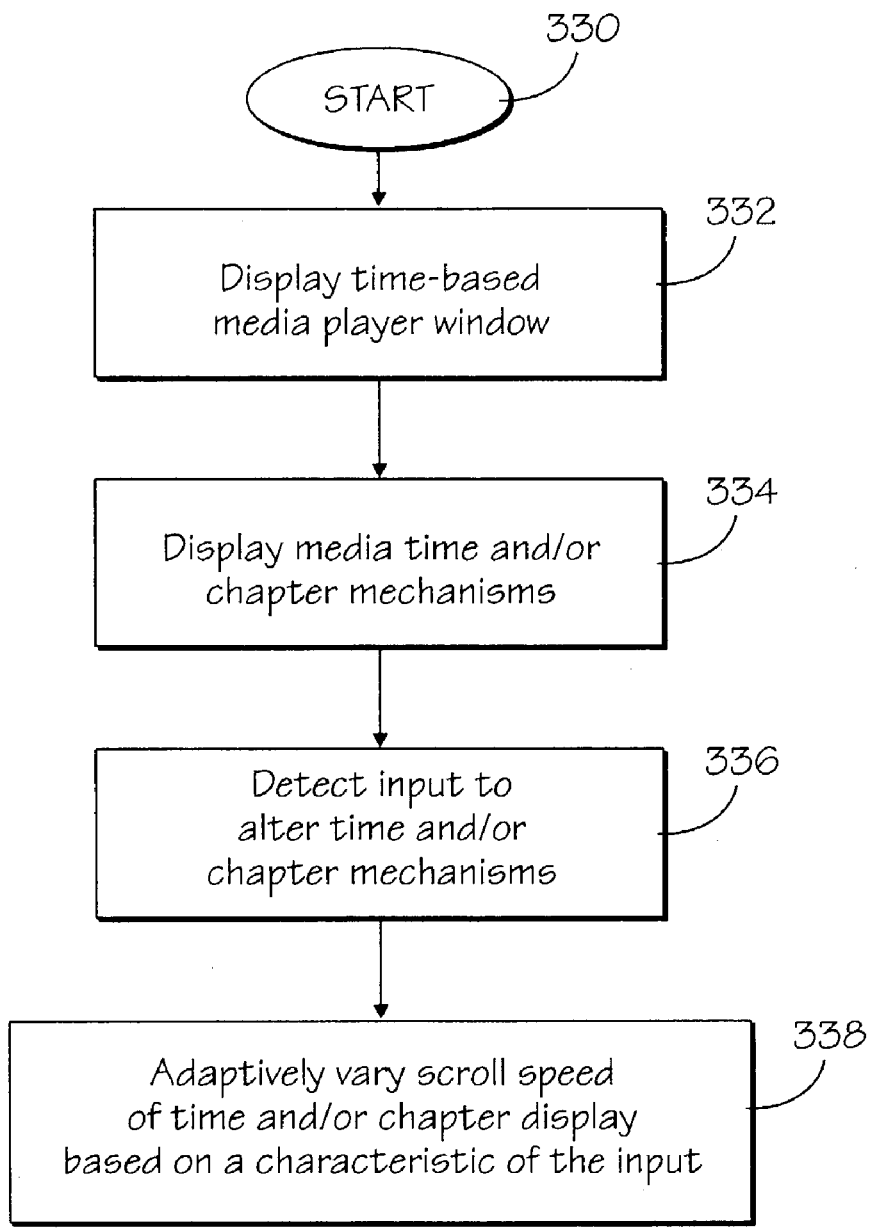
FIG. 12A is a flow diagram illustrating a method for providing adaptive chapter/time selection for play back or other processing of time-based media in a GUI, according to one embodiment of the invention.

FIG. 12A is a flow diagram illustrating a method for providing adaptive chapter/time selection for play back or other processing of time-based media in a GUI, according to one embodiment of the invention. Flow begins at block 330.

At block 332, a time-based media player window, such as the media player 200 window shown in FIG. 3A, is displayed.

At block 334, media time and/or chapter control and/or display mechanisms are displayed. For example, in one embodiment, such mechanisms may include a time display (e.g., the time display 262 shown in FIGS. 8A and 8B), a time bar with selection markers and/or a current time indicator (such as shown in FIGS. 8A and 8B), and/or a chapter display/control (e.g., the adaptive chapter display/control 260 shown in FIGS. 8A and 8B).

At block 336, input is detected to alter a time or chapter (which two are typically, but not necessarily linked). For example, such input may include a user placing the cursor in the chapter display/control or the time display and then dragging the cursor up or down to scroll up or down through chapters (or time).

At block 338, based on a characteristic of the input, the time and/or chapter is adaptively changed. In one embodiment, the characteristic includes the speed in which a cursor is dragged over the chapter display/control (or time display). Based on measuring the time in which the cursor covers a specified distance, the cursor dragging speed is determined. Once the drag speed is determined, the speed in which the displayed chapters in the chapter display/control are scrolled is varied in direct proportion to the cursor drag speed. As such, a user can control the speed he/she wishes to scroll through and view chapters or time by using various cursor dragging speeds to obtain directly proportional scrolling speeds.

Figure 12B:
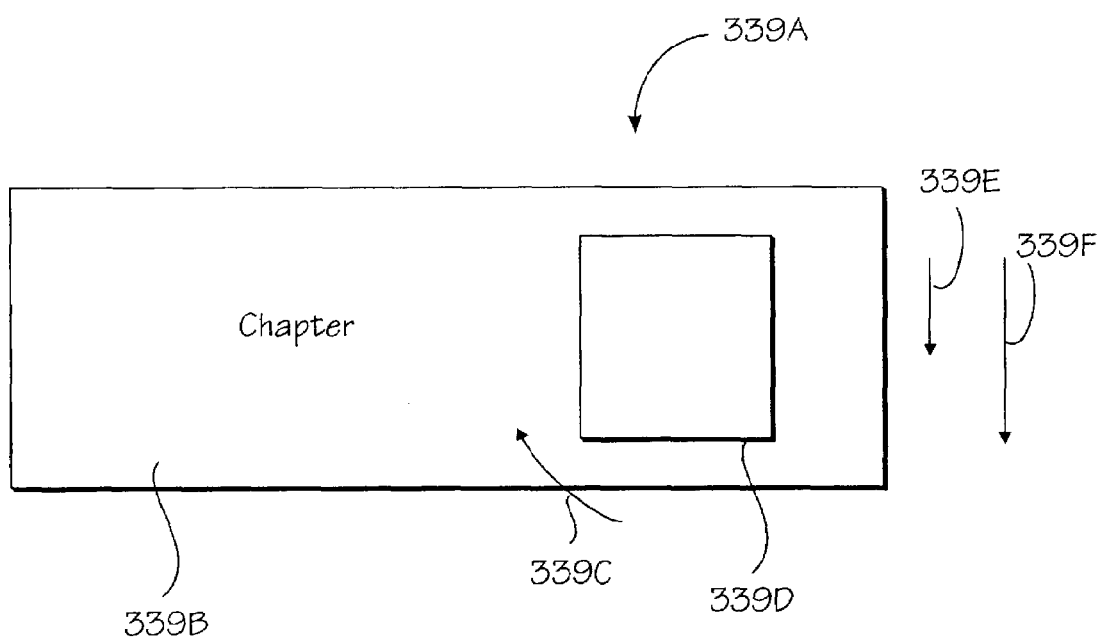
FIG. 12B shows an example of a chapter selection interface which adaptively scrolls a chapter indicator (e.g. a chapter number or name) in response to user input (e.g. speed of cursor movement).

FIG. 12B shows a representation of a graphical user interface which may be used with a method shown in FIG. 12A. The interface shown in FIG. 12B is similar to the adaptive chapter portion of the interface shown in FIGS. 7A and 7B. It will be appreciated that the chapter display area 339a of FIG. 12B may display the names of the chapters (e.g. swim excitedly) rather than the designator "chapter" with a numeral as shown in FIG. 12B. The designator chapter 339b may alternatively say sections or other designators to indicate portions of the time-based media. A numeral region 339d may display a numeral indicating the chapter number and this area 339d may provide for scrolling of numerals within the area in response to selecting the chapter region 339a. This selection may be performed by positioning the cursor 339c in the chapter area and then dragging the cursor in an up or down direction. The arrows 339e and 339f represent different velocities of the drag which will in turn cause different scrolling speeds within the numeral area 339d. In this manner, the user may control the scrolling speed of the chapter designators (e.g. chapter numerals or titles) by controlling the speed of the cursor during a drag of the cursor over the chapter area 339a.

Auxiliary Drawer/Tray Windows

Figure 13:
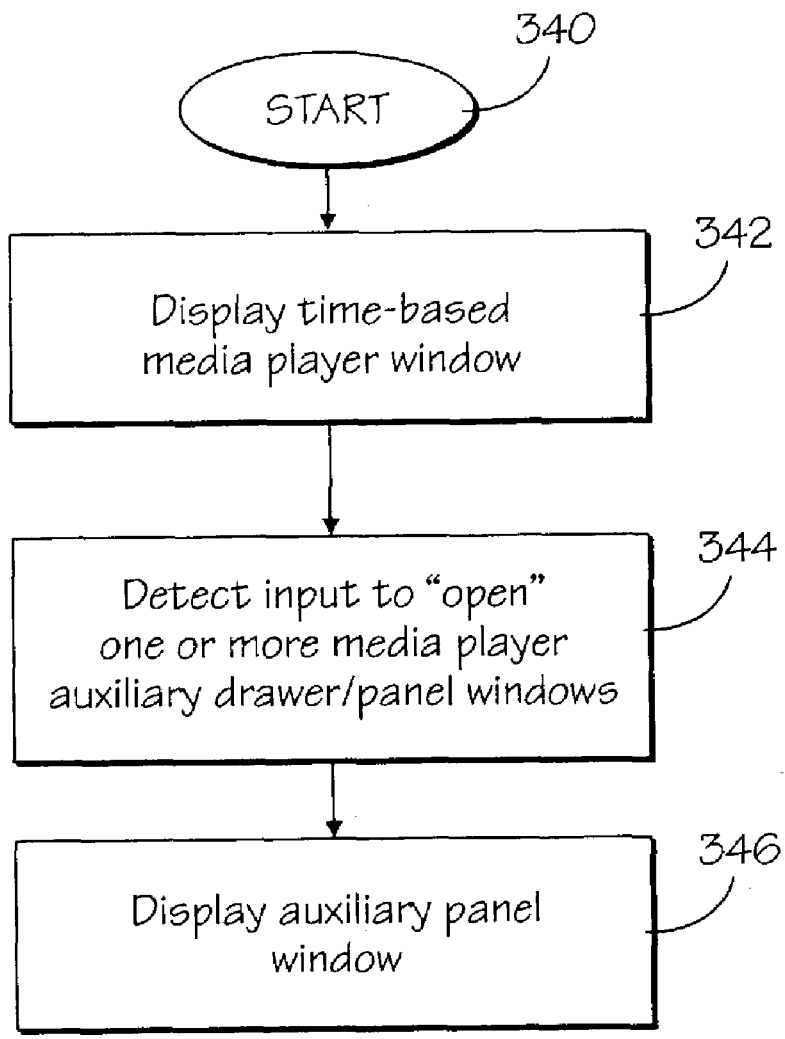
FIG. 13 is a flow diagram illustrating a method for providing auxiliary drawers/panels for a time-based media player generated as a GUI, according to one embodiment of the invention.

FIG. 13 is a flow diagram illustrating a method for providing auxiliary drawers/trays for a time-based media player generated as a GUI, according to one embodiment of the invention. Flow begins at block 340.

At block 342, a time-based media player window, such as the media player 200 window shown in FIG. 3A, is displayed.

At block 344, input is detected to open one or more auxiliary drawer windows, such as the information drawer 250 or control drawer 252, described above with reference to FIGS. 6A-6B. The input may include the selection of a button displayed on the window (e.g. clicking of a pointing device select button (e.g., a mouse button) with the cursor over an icon that controls the auxiliary drawer window to be opened).

At block 346, the auxiliary drawer window is "opened" for display. In one embodiment, the auxiliary drawer is of a predetermined size. In alternative embodiments, one or more auxiliary drawers may be selectively displayed at various sizes (e.g., under user control), for example, as depicted by the drawer window shown in FIGS. 4-5A. The auxiliary drawer may provide information about time-based media and/or provide mechanisms for play back or other processing of time-based media. Such mechanisms may include display and/or control of bass, treble, balance; a graphic equalizer; forward/backward rewind, scan, skip, etc., or other controls for play back or processing of time-based media information such as audio, video, or a combination thereof. Once the auxiliary drawer is displayed, various controls may be modified or selected by the user.

Software Overview

Figure 14:
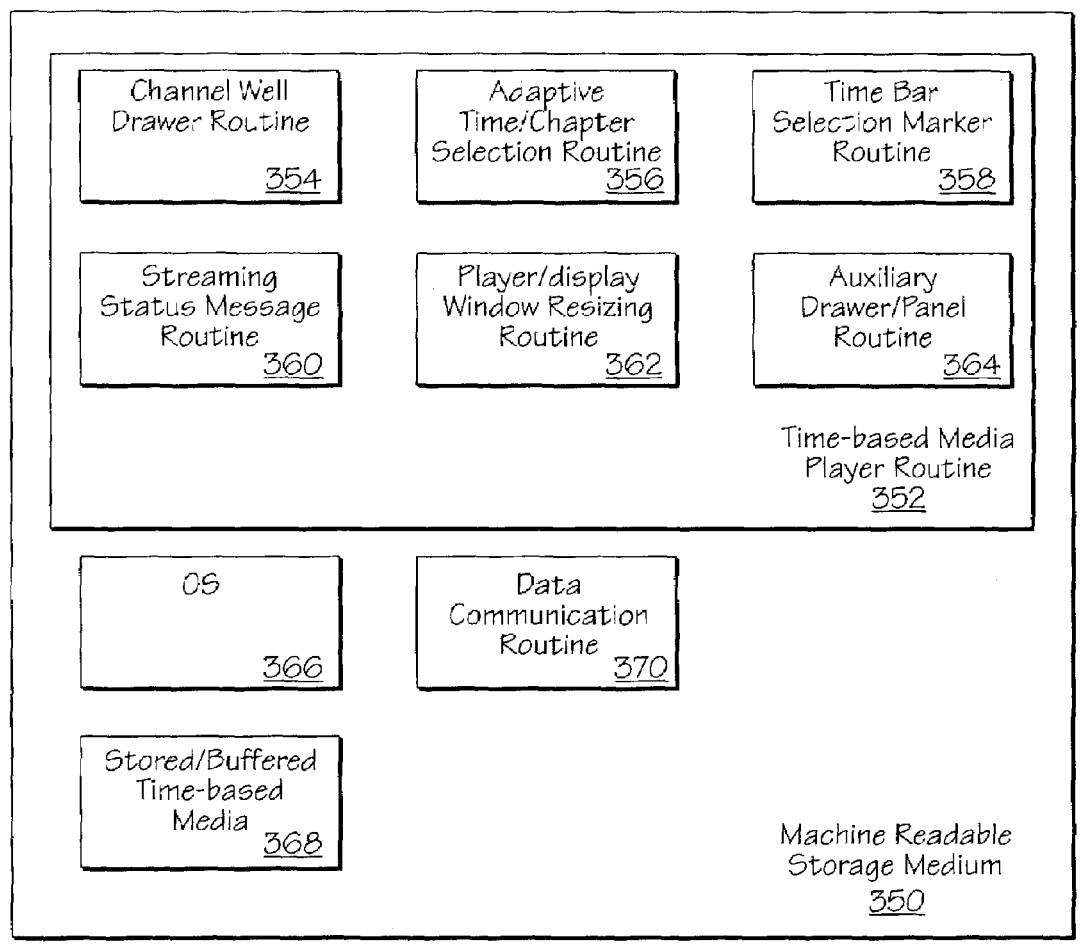
FIG. 14 is a block diagram of a machine-readable medium storing executable code and/or other data to provide one or a combination of mechanisms for play back or other processing of time-based media in a GUI, according to one embodiment of the invention.

FIG. 14 is a block diagram of a machine-readable medium storing executable code and/or other data to provide one or a combination of mechanisms for play back or other processing of time-based media in a GUI, according to one embodiment of the invention. The machine-readable storage medium 350 represents one or a combination of various types of media/devices for storing machine-readable data, which may include machine-executable code or routines. As such, the machine-readable storage medium 350 could include, but is not limited to one or a combination of a magnetic storage space (e.g., a hard or floppy disk), magneto-optical storage, tape, optical storage (e.g., CD ROM, DVD, etc.), dynamic random access memory (DRAM), static RAM (SRAM), flash memory, etc.

The medium 350 is shown storing a time-based media player routine 352 which, when executed, provides a time-based media player as a GUI such as the player 200. The time-based media player routine 352 includes a number of mechanisms for playing back or otherwise processing time-based media processed by the time-based media player. For example, a drawer routine 354 generates a drawer window, such as drawer 230, for display. The drawer may contain wells for displaying one or more references (icons) to media, such as files/channels, which may be stored locally by a digital processing coupled to the medium 350, or by a remote system, such as a time-based media Web server. The drawer routine 354 may also facilitate altering of the drawer to add, delete, rearrange, select for play back, etc., icons displayed therein. An adaptive time/chapter selection routine 356 allows adaptively varying the display of time or chapter information (e.g., the speed at which such information is displayed as being scrolled, as described in conjunction with FIGS. 12A and 12B) in response to detection of an input characteristic (e.g., cursor drag speed when user input causes such information to be varied). A time bar selection marker routine 358 provides a time bar for display, as well as select start/end and current time marker functionality, as described, for example, with reference to FIGS. 8A-8C or 8D-8F. A streaming status message routine 360 provide streaming of status messages, for example, as described above with reference to FIGS. 9A-9B or 9C-9H. A player/display window resizing routine allows resizing of a time-based media player window and/or a motion video display window according to one or more of the methods described above, for example, with reference to FIGS. 10A-10F. Finally, an auxiliary drawer routine provides display areas in the form of drawers in addition to or in lieu of the favorite/channel drawer, which auxiliary drawers may provide information or additional mechanisms for display and play back or other processing of media.

The machine readable storage medium may also store an operating system (OS) 366, which may provide a graphical window/icon oriented environment; a data communication routine 370 that facilitates transfer of media and/or other information over a digital processing network; and/or stored/buffered time-based media 368.

It will be appreciated that alternative embodiments of the GUI for processing time-based information may include fewer or more of the functions described herein. Furthermore, the invention may be implemented in any combination of hardware and/or software.

Alternative Embodiments

While the invention has been described in terms of several embodiments and illustrative figures, those skilled in the art will recognize that the invention is not limited to the embodiments or figures described. In particular, the invention can be practiced in several alternative embodiments that provide one or a combination of mechanisms for playing back or otherwise processing time-based media information (e.g., QuickTime movies) in a graphical user interface. Furthermore, the icons in a drawer may represent media other than time-based media, such as still images or interactive content or Web page links, etc.

Therefore, it should be understood that the method and apparatus of the invention can be practiced with modification and alteration within the spirit and scope of the appended claims. The description is thus to be regarded as illustrative instead of limiting on the invention.

What is claimed is:

1. A method for selecting a portion of a time-based media for playback comprising:
    displaying a media player for playing time-based media in a window, wherein said media player is also configured to present streaming media and wherein said media player does not display editing commands;
    displaying a graphical representation of a time line on said media player, said graphical representation of a time line includes a first end and a second end representing respectively a beginning of said time-based media and an end of said time-based media which is available for presentation in a playback mode;
    setting at least one of a start time in said time-based media in response to a first user action, or an end time in said time-based media in response to a second user action, said start time being after said beginning of said time-based media, said end time being before said end of said time-based media and after said start time, said start time being a beginning for said playback, and said end time being an end for said playback;
    displaying a graphical representation of at least one of said start and end times along the graphical representation of said time line to provide a visual representation of said portion of said time-based media; and
    displaying in replay mode said portion of said time-based media wherein said start time being a beginning of said playback and said end time being an end for said playback.

2. The method of claim 1, wherein said first user action comprises dragging said graphical representation of said start time to a position on said graphical representation of said time line representing said start time, and wherein said second user action comprises dragging said graphical representation of said end time to a position on said graphical representation of said time line representing said end time.

3. The method of claim 1, wherein said time-based media comprises one of video data, audio data, visual data, and a combination of audio and video data and wherein said time line is configured to indicate a current position in said time-based media.

4. The method of claim 3, further comprising storing said time-based media as a QuickTime movie.

5. The method of claim 1, further comprising displaying a current time corresponding to a current position along said time line and updating said current time in response to said first and second user actions.

6. The method of claim 5, wherein displaying said current time comprises displaying a cursor corresponding to said current time along said graphical representation of a time line.

7. The method of claim 6, wherein displaying said current time further comprises displaying a numerical representation of said current time, and displaying an indicator of a section of said time-based media.

8. The method of claim 7, wherein said section represents a chapter in said time-based media.

9. The method of claim 6, further comprising receiving a third user action upon said cursor to alter said current position of said time-based media and to display a frame of said time-based media corresponding to said altered current position.

10. The method of claim 9, wherein said third user action comprises dragging said cursor along said graphical representation of a time line.

11. The method of claim 9, further comprising:
    displaying a first indicator and highlighting said graphical representation of said start time to indicate an occurrence of said first user action;
    displaying a second indicator and highlighting said graphical representation of said end time to indicate an occurrence of said second user action; and
    displaying a third indicator and highlighting said cursor to indicate an occurrence of said third user action.

12. A machine readable medium having stored thereon executable program code which, when executed, causes a machine to perform a method for selecting a portion of a time-based media for playback, said method comprising:
    displaying a media player for playing time-based media in a window, wherein said media player is also configured to present streaming media and wherein said media player does not display editing commands;
    displaying a graphical representation of a time line on said media player, said graphical representation of a time line includes a first end and a second end representing respectively a beginning of said time-based media and an end of said time-based media which is available for presentation in a playback mode;

setting at least one of a start time in said time-based media in response to a first user action, or an end time in said time-based media in response to a second user action, said start time being after said beginning of said time-based media, said end time being before said end of said time-based media and after said start time, said start time being a beginning for said playback, and said end time being an end for said playback;

displaying a graphical representation of at least one of said start and end times along the graphical representation of said time line to provide a visual representation of said portion of said time-based media; and displaying in replay mode said portion of said time-based media wherein said start time being a beginning of said playback and said end time being an end for said playback.

13. A machine readable medium as in claim 12, wherein said first user action comprises dragging said graphical representation of said start time to a position on said graphical representation of said time line representing said start time, and wherein said second user action comprises dragging said graphical representation of said end time to a position on said graphical representation of said time line representing said end time.

14. A machine readable medium as in claim 12, wherein said time-based media comprises one of video data, audio data, visual data, and a combination of audio and video data and wherein said time line is configured to indicate a current position in said time-based media.

15. A machine readable medium as in claim 14, said method further comprising storing said time-based media as a QuickTime movie.

16. A machine readable medium as in claim 12, said method further comprising displaying a current time corresponding to a current position along said time line and updating said current time in response to said first and second user actions.

17. A machine readable medium as in claim 16, wherein displaying said current time comprises displaying a cursor corresponding to said current time along said graphical representation of a time line.

18. A machine readable medium as in claim 17, wherein displaying said current time further comprises displaying a numerical representation of said current time, and displaying an indicator of a section of said time-based media.

19. A machine readable medium as in claim 18, wherein said section represents a chapter in said time-based media.

20. A machine readable medium as in claim 17, said method further comprising receiving a third user action upon said cursor to alter said current position of said time-based media and to display a frame of said time-based media corresponding to said altered current position.

21. A machine readable medium as in claim 20, wherein said third user action comprises dragging said cursor along said graphical representation of a time line.

22. A machine readable medium as in claim 20, said method further comprising:

displaying a first indicator and highlighting said graphical representation of said start time to indicate an occurrence of said first user action;

displaying a second indicator and highlighting said graphical representation of said end time to indicate an occurrence of said second user action; and displaying a third indicator and highlighting said cursor to indicate an occurrence of said third user action.

23. A digital processing system for selecting a portion of a time-based media for replay, said digital processing system comprising:

means for displaying a media player for playing time-based media in a window, wherein said media player is also configured to present streaming media and wherein said media player does not display editing commands;

means for displaying a graphical representation of a time line on said media player, said graphical representation of a time line includes a first end and a second end representing respectively a beginning of said time-based media and an end of said time-based media which is available for presentation in a playback mode;

means for setting at least one of a start time in said time-based media in response to a first user action, or an end time in said time-based media in response to a second user action, said start time being after said beginning of said time-based media, said end time being before said end of said time-based media and after said start time, said start time being a beginning for said playback, and said end time being an end for said playback;

means for displaying a graphical representation of at least one of said start and end times along the graphical representation of said time line to provide a visual representation of said portion of said time-based media; and means for displaying in replay mode said portion of said time-based media wherein said start time being a beginning of said playback and said end time being an end for said playback.

24. A digital processing system as in claim 23, wherein said first user action comprises means for dragging said graphical representation of said start time to a position on said graphical representation of said time line representing said start time, and wherein said second user action comprises means for dragging said graphical representation of said end time to a position on said graphical representation of said time line representing said end time.

25. A digital processing system as in claim 23, wherein said time-based media comprises one of video data, audio data, visual data, and a combination of audio and video data and wherein said time line is configured to indicate a current position in said time-based media.

26. A digital processing system as in claim 25, further comprising means for storing said time-based media as a QuickTime movie.

27. A digital processing system as in claim 23, further comprising means for displaying a current time corresponding to a current position along said time line and means for updating said current time in response to said first and second user actions.

28. A digital processing system as in claim 27, wherein said means for displaying said current time comprises means for displaying a cursor corresponding to said current time along said graphical representation of a time line.

29. A digital processing system as in claim 28, wherein said means for displaying said current time further comprises means for displaying a numerical representation of said current time, and means for displaying an indicator of a section of said time-based media.

30. A digital processing system as in claim 29, wherein said section represents a chapter in said time-based media.

31. A digital processing system as in claim 28, further comprising means for receiving a third user action upon said cursor to alter said current position of said time-based media and to display a frame of said time-based media corresponding to said altered current position.

32. A digital processing system as in claim 31, wherein said third user action comprises means for dragging said cursor along said graphical representation of a time line.

33. A digital processing system as in claim 31, further comprising:
  means for displaying a first indicator and highlighting said graphical representation of said start time to indicate an occurrence of said first user action;
  means for displaying a second indicator and highlighting said graphical representation of said end time to indicate an occurrence of said second user action; and
  means for displaying a third indicator and highlighting said cursor to indicate an occurrence of said third user action.

34. A digital processing system, comprising:
  a digital processor coupled to a display device;
  a memory coupled to said digital processor, said memory receiving a time-based media for display on said display device, said processor:
  displaying a media player for playing time-based media in a window, wherein said media player is also configured to present streaming media and wherein said media player does not display editing commands;
  displaying a graphical representation of a time line on said media player, said graphical representation of a time line includes a first end and a second end representing respectively a beginning of said time-based media and an end of said time-based media which is available for presentation in a playback mode;
  setting at least one of a start time in said time-based media in response to a first user action, or an end time in said time-based media in response to a second user action, said start time being after said beginning of said time-based media, said end time being before said end of said time-based media and after said start time, said start time being a beginning for said playback, and said end time being an end for said playback;
  displaying a graphical representation of at least one of said start and end times along the graphical representation of said time line to provide a visual representation of said portion of said time-based media; and
  displaying in replay mode said portion of said time-based media wherein said start time being a beginning of said playback and said end time being an end for said playback.

35. A digital processing system as in claim 34, wherein said first user action comprises dragging said graphical representation of said start time to a position on said graphical representation of said time line representing said start time, and wherein said second user action comprises dragging said graphical representation of said end time to a position on said graphical representation of said time line representing said end time.

36. A digital processing system as in claim 34, wherein said time-based media comprises one of video data, audio data, visual data, and a combination of audio and video data and wherein said time line is configured to indicate a current position in said time-based media.

37. A digital processing system as in claim 36, said processor further storing said time-based media as a QuickTime movie.

38. A digital processing system as in claim 34, said processor further displaying a current time corresponding to a current position along said time line and updating said current time in response to said first and second user actions.

39. A digital processing system as in claim 38, wherein displaying said current time comprises displaying a cursor corresponding to said current time along said graphical representation of a time line.

40. A digital processing system as in claim 39, wherein displaying said current time further comprises displaying a numerical representation of said current time, and displaying an indicator of a section of said time-based media.

41. A digital processing system as in claim 40, wherein said section represents a chapter in said time-based media.

42. A digital processing system as in claim 39, said processor further receiving a third user action upon said cursor to alter said current position of said time-based media and to display a frame of said time-based media corresponding to said altered current position.

43. A digital processing system as in claim 42, wherein said third user action comprises dragging said cursor along said graphical representation of a time line.

44. A digital processing system as in claim 42, said processor further:
  displaying a first indicator and highlighting said graphical representation of said start time to indicate an occurrence of said first user action;
  displaying a second indicator and highlighting said graphical representation of said end time to indicate an occurrence of said second user action; and
  displaying a third indicator and highlighting said cursor to indicate an occurrence of said third user action.

45. A method for selecting a portion of a stored time-based media for playback, the method comprising:
  displaying a media player for playing stored time-based media in a window;
  displaying a graphical representation of a time line on said media player, said graphical representation of a time line includes a first end and a second end representing respectively a beginning of said stored time-based media and an end of said time-based media which is available for presentation in a playback mode;
  setting at least one of a start time in said stored time-based media in response to a first user action, or an end time in said stored time-based media in response to a second user action, said start time being after said beginning of said stored time-based media, said end time being before said end of said stored time-based media and after said start time, said start time being a beginning for said playback, and said end time being an end for said playback;
  displaying a graphical representation of at least one of said start and end times to provide a visual representation of said portion of said stored time-based media; and
  displaying in playback mode said portion of said stored time-based media wherein said start time being a beginning of said playback and said end time being an end for said playback, wherein said media player does not allow altering of said stored time-based media.

46. The method of claim 45, wherein said first user action comprises dragging said graphical representation of said start time to a position on said graphical representation of said time line representing said start time, and wherein said second user action comprises dragging said graphical representation of said end time to a position on said graphical representation of said time line representing said end time.

47. The method of claim 45, wherein said stored time-based media comprises one of video data, audio data, visual data, and a combination of audio and video data and wherein said time line is configured to indicate a current position in said time-based media.

48. The method of claim 45, further comprising displaying a current time corresponding to a current position along said time line and updating said current time in response to said first and second user actions.

49. The method of claim 48, wherein displaying said current time comprises displaying a cursor corresponding to said current time along said graphical representation of a time line.

50. The method of claim 48, wherein displaying said current time further comprises displaying a numerical representation of said current time, and displaying an indicator of a section of said stored time-based media.

51. A machine readable medium having stored thereon executable program code which, when executed, causes a machine to perform a method for selecting a portion of a time-based media for playback, said method comprising:
  displaying a media player for playing stored time-based media in a window;
  displaying a graphical representation of a time line on said media player, said graphical representation of a time line includes a first end and a second end representing respectively a beginning of said stored time-based media and an end of said time-based media which is available for presentation in a playback mode;
  setting at least one of a start time in said stored time-based media in response to a first user action, or an end time in said stored time-based media in response to a second user action, said start time being after said beginning of said stored time-based media, said end time being before said end of said stored time-based media and after said start time, said start time being a beginning for said playback, and said end time being an end for said playback;
  displaying a graphical representation of at least one of said start and end times to provide a visual representation of said portion of said stored time-based media; and
  displaying in playback mode said portion of said stored time-based media wherein said start time being a beginning of said playback and said end time being an end for said playback, wherein said media player does not allow altering of said stored time-based media.

52. The medium of claim 51, wherein said first user action comprises dragging said graphical representation of said start time to a position on said graphical representation of said time line representing said start time, and wherein said second user action comprises dragging said graphical representation of said end time to a position on said graphical representation of said time line representing said end time.

53. A machine readable medium as in claim 51, wherein said stored time-based media comprises one of video data, audio data, visual data, and a combination of audio and video data and wherein said time line is configured to indicate a current position in said time-based media.

54. A machine readable medium as in claim 51, the method further comprising displaying a current time corresponding to a current position along said time line and updating said current time in response to said first and second user actions.

55. The medium of claim 54, wherein displaying said current time comprises displaying a cursor corresponding to said current time along said graphical representation of a time line.

56. The medium of claim 55, wherein displaying said current time further comprises displaying a numerical representation of said current time, and displaying an indicator of a section of said stored time-based media.

* * * * *